(12) United States Patent
Sukegawa et al.

(10) Patent No.: US 9,394,847 B2
(45) Date of Patent: Jul. 19, 2016

(54) FUEL INJECTION CONTROL APPARATUS FOR INTERNAL COMBUSTION ENGINE

(71) Applicant: Hitachi Automotive Systems, Ltd., Hitachinaka-shi, Ibaraki (JP)

(72) Inventors: Yoshihiro Sukegawa, Tokyo (JP); Masayuki Saruwatari, Hitachinaka (JP); Kohsuke Kanda, Hitachinaka (JP); Yoshitatsu Nakamura, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 265 days.

(21) Appl. No.: 14/099,173

(22) Filed: Dec. 6, 2013

(65) Prior Publication Data
US 2014/0158092 A1    Jun. 12, 2014

(30) Foreign Application Priority Data

Dec. 7, 2012    (JP) ................................ 2012-267895

(51) Int. Cl.
*F02D 7/00* (2006.01)
*F02D 41/34* (2006.01)
(Continued)

(52) U.S. Cl.
CPC .......... *F02D 41/345* (2013.01); *F02D 13/0219* (2013.01); *F02D 41/182* (2013.01); *F02D 41/107* (2013.01); *F02D 2011/102* (2013.01); *F02D 2041/001* (2013.01); *F02D 2041/1432* (2013.01); *F02D 2041/286* (2013.01);
(Continued)

(58) Field of Classification Search
CPC . F02D 7/00; F02D 2200/0406; F02D 35/023; F02D 41/401; Y02T 10/42

USPC ......... 123/295, 299, 445, 478, 480, 500–505; 701/102–105
See application file for complete search history.

(56) References Cited

U.S. PATENT DOCUMENTS

| | | | | |
|---|---|---|---|---|
| 5,390,649 A | * | 2/1995 | Miener ............... | F02D 41/0047 123/676 |
| 5,918,577 A | * | 7/1999 | Martelli ............... | F02B 17/00 123/295 |

(Continued)

FOREIGN PATENT DOCUMENTS

| | | |
|---|---|---|
| JP | 04-303141 A | 10/1992 |
| JP | 08-121233 A | 5/1996 |

(Continued)

OTHER PUBLICATIONS

State Intellectual Property Office of People's Republic of China; First office action on application 201310642435.1 dated Dec. 1, 2015; 9 pages; (with partial English translation).

*Primary Examiner* — John Kwon
*Assistant Examiner* — Johnny H Hoang
(74) *Attorney, Agent, or Firm* — Foley & Lardner LLP

(57) ABSTRACT

A fuel injection control apparatus for fuel injection at optimum timing in correspondence with level of gas flow velocity in an intake port upon intake stroke injection. A fuel injection valve is controlled so as to set a large majority (more than half) of an injection period to inject fuel during an intake stroke in respective cylinders within a period where intake port gas pressure is increased. Upon intake stroke injection, the fuel is injected at optimum timing in correspondence with the direction and the level of gas flow velocity in the intake port. Accordingly, the status of air-fuel mixture in a combustion chamber is excellent. It is possible to improve fuel consumption and to reduce exhaust emission.

11 Claims, 20 Drawing Sheets

(51) Int. Cl.
- *F02D 41/18* (2006.01)
- *F02D 13/02* (2006.01)
- *F02D 41/10* (2006.01)
- *F02D 11/10* (2006.01)
- *F02D 41/00* (2006.01)
- *F02D 41/14* (2006.01)
- *F02D 41/28* (2006.01)

(52) U.S. Cl.
CPC ... *F02D2200/021* (2013.01); *F02D 2200/0402* (2013.01); *F02D 2200/0404* (2013.01); *F02D 2200/0406* (2013.01); *F02D 2200/101* (2013.01); *Y02T 10/18* (2013.01); *Y02T 10/44* (2013.01)

(56) References Cited

U.S. PATENT DOCUMENTS

| | | | | |
|---|---|---|---|---|
| 5,928,303 | A * | 7/1999 | Sakai | F02D 41/1474 701/109 |
| 6,305,364 | B1 * | 10/2001 | Ma | F02B 1/12 123/568.14 |
| 6,550,451 | B1 * | 4/2003 | Muller | F02D 41/0062 123/406.45 |
| 7,693,646 | B2 * | 4/2010 | Moriya | F02D 35/023 123/435 |
| 2003/0056752 | A1 * | 3/2003 | Sukegawa | F02B 1/12 123/305 |
| 2004/0149268 | A1 * | 8/2004 | Hasegawa | F02D 41/345 123/478 |
| 2005/0133001 | A1 * | 6/2005 | Kaneko | F02B 51/02 123/299 |
| 2011/0186013 | A1 * | 8/2011 | Sasaki | F02D 41/0025 123/445 |
| 2012/0216776 | A1 * | 8/2012 | Nagatsu | F02D 13/0234 123/305 |
| 2014/0007841 | A1 | 1/2014 | Kawai | |

FOREIGN PATENT DOCUMENTS

| | | |
|---|---|---|
| JP | 09-209851 A | 8/1997 |
| JP | 2003-083126 A | 3/2003 |
| JP | 2003-090243 A | 3/2003 |
| WO | WO 2012/127622 A1 | 9/2012 |

* cited by examiner

FLOW VELOCITY DISTRIBUTION IN
INTAKE PORT WHEN dPM/dt>0 HOLDS

FLOW VELOCITY DISTRIBUTION IN
INTAKE PORT WHEN dPM/dt<0 HOLDS

INTAKE STROKE,
INJECTION PERIOD

INTAKE STROKE,
AFTER INJECTION

IGNITION TIMING

INTAKE STROKE,
INJECTION PERIOD

INTAKE STROKE, AFTER INJECTION

IGNITION TIMING

TRANSITION INJECTION TIME
(MAP DATA)

$(T12+T22)/(T11+T21) > 0.5$

FUEL INJECTION CONTROL APPARATUS FOR INTERNAL COMBUSTION ENGINE

CLAIM OF PRIORITY

The present application claims priority from Japanese Patent applications serial No. 2012-267895, filed on Dec. 7, 2012, the respective contents of which are hereby incorporated by reference into this application.

FIELD OF THE INVENTION

The present invention relates to a fuel injection control apparatus to supply fuel to a combustion chamber of an internal combustion engine, and more particularly, to a fuel injection control apparatus for an internal combustion engine having a fuel injection valve in an intake port connected to the combustion chamber.

BACKGROUND OF THE INVENTION

In vehicles at present time, reduction of exhaust gas materials such as carbon monoxide (CO), carbon hydride (HC) and nitrogen oxide (NOx) included in exhaust gas from the vehicles is required in terms of environmental conservation. Further, reduction of exhaust amount of carbon dioxide ($CO_2$) is a serial problem, and improvement of fuel consumption is also required for this purpose. To respond to these requirements, a fuel injection control apparatus to inject fuel to an internal combustion engine is developed and improved.

Generally, as a method for supplying fuel to a combustion chamber of an internal combustion engine, direct injection method to directly inject fuel to the combustion chamber with a fuel injection valve provided in a cylinder head of the combustion chamber, and a multi-point injection method to inject fuel into an intake port connected to the combustion chamber with a fuel injection valve provided in the intake port. The present invention relates to the latter method, multi point injection method.

In the multi point injection method, since the intake port is provided with the fuel injection valve, it is necessary to supply fuel, injected from the fuel injection valve, on an air flow, to the combustion chamber. For example, Japanese Patent Laid open No. 2003-83126 (Patent Literature 1) discloses the following technique.

That is, a fuel injection valve is provided toward an intake valve and a flow velocity sensor to detect flow velocity in the intake port is provided in the intake port. Upon cooling, to avoid attachment of fuel to the intake valve, fuel is injected during an intake stroke where the intake valve is open. In the internal combustion engine, since gas reverse flow occurs from the combustion chamber immediately after the valve opening of the intake valve, a crank angle upon termination of reverse flow is obtained with the flow velocity sensor, and fuel injection is performed with the reverse flow termination time possible to supply the injected fuel, on the air flow, to the combustion chamber.

In a reciprocating internal combustion engine which performs intermittent intake operation, an intake pulse occurs due to propagation of pressure wave in the intake port. The form of the intake pulse has different variants in accordance with the number of cylinders forming the internal combustion engine, intake/exhaust valve opening/closing timing, the number of engine revolutions, load and the like.

In the above described Patent Literature 1, the crank angle upon termination of reverse flow in the intake port is obtained with the flow velocity sensor provided in the intake port, and injection is performed at the time of the reverse flow termination as the injection start time. In this patent literature 1, the direction of the gas in the intake port is taken into consideration, however, there is no consideration about the level of gas flow velocity in the intake port.

In a status where the intake pulse occurs, the level of the gas flow velocity as well as the direction of the gas flow velocity changes in the intake port. The level of gas flow velocity in the intake port has much influence on the behavior of fuel injected at the intake stroke. When the fuel is injected at timing where the level of the gas flow velocity in the intake port is inappropriate, the fuel consumption may be degraded or the exhaust emission may be increased.

The present invention provides a fuel injection control apparatus for an internal combustion engine capable of, upon intake stroke injection, injecting fuel at optimum timing in correspondence with the level of gas flow velocity in an intake port.

SUMMARY OF THE INVENTION

In the present invention, a fuel injection valve is controlled such that a large majority (over half) of an injection period where the fuel is injected during the intake stroke of each cylinder is within a period where the intake port gas pressure is increased.

According to the present invention, upon intake stroke injection, the fuel is injected at optimum timing in correspondence with the direction and level of the gas flow velocity in the intake port. Accordingly, it is possible to attain an excellent air-fuel mixture status in the combustion chamber and it is possible to improve fuel consumption and reduce exhaust emission.

DETAILED DESCRIPTION OF THE PREFERRED EMBODIMENTS

Preferred embodiments of the present invention will now be described in detail in accordance with the accompanying drawings. The present invention is not limited to the following embodiments. In the technical concept of the present invention, various modifications and applications are included in its scope.

First Embodiment

Figure 1:
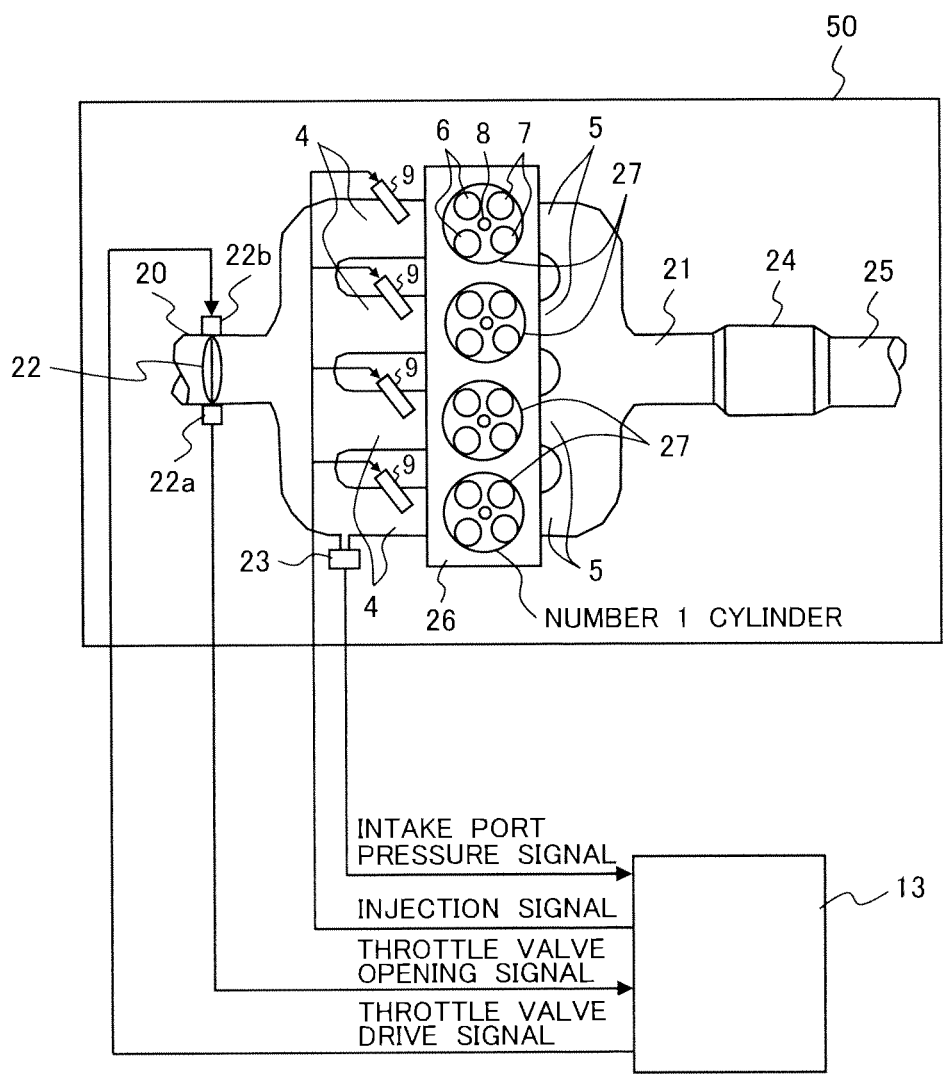
FIG. 1 illustrates structures of an internal combustion engine and its fuel injection control apparatus according to a first embodiment of the present invention.

In the present embodiment, an example of a fuel injection control apparatus for an internal combustion engine to inject fuel at optimum timing in correspondence with the level of gas flow velocity in an intake port will be described. FIG. 1 shows an example of the internal combustion engine according to the first embodiment.

An internal combustion engine 50 has an intake manifold 20, an intake port 4, a cylinder block 26, an exhaust port 5, an exhaust manifold 21, a catalyst converter 24, and an exhaust pipe 25. The cylinder block 26 has a 4 cylinder engine structure having four cylinders 27. Each cylinder head is provided with respectively two intake valves 6, two exhaust valves 7 and one ignition plug 8. The intake port 4 independently provided in each cylinder is provided with an injector 9 to supply fuel into the intake port. It may be arranged such that one intake port is provided with plural injectors 9. For example, a dual injection form where one injector is provided with respect to each of two-valve cylinder may be used.

In the dual injection, since the amount of fuel flow per one injector is reduced, the particle diameter of spray injected from the injector is reduced. With this arrangement, when the suppress attachment of the fuel to a cylinder wall or the like, and to reduce exhaust emission and fuel consumption.

The intake port 4 of the number 1 cylinder is provided with an intake port pressure sensor 23 to detect intake port gas pressure. It is desirable that the intake port pressure sensor 23 follows time variation of the intake port pressure by pulse and its response time is within 1 ms. The intake port pressure sensor 23 may be provided in all the intake ports 4. In the present embodiment, the intake port pressure sensor is provided in one intake port in terms of price. In this case, as the pressures in the other intake ports, which are correlated with measured intake pressure, are estimated by estimation method to be described later. Note that the intake pressure sensor may be incorporated in a fuel injection valve 9.

To measure pulse pressure by cylinder, it is significant that the intake port pressure sensor 23 is provided in the independent intake port by cylinder. For example, the intake pressure sensor provided in the intake manifold (so-called MAP sensor) detects the pressure combined from the pulse pressures in the respective cylinders, accordingly, it is difficult to separate it into the pulse pressures in the respective cylinders.

An intake port pressure signal detected with the intake port pressure sensor 23 is read with an ECU (Engine Control Unit) 13 as a fuel injection computation unit. Note that the ECU 13 has a function of calculation of an ignition time signal, intake/exhaust valve phase control signals, throttle valve opening control signal and the like to operate object devices in addition to calculation of an injection amount signal of the fuel injection valve and an injection time signal.

The intake manifold has a throttle valve 22 to control intake gas amount. The throttle valve opening is detected with an opening encoder 22a. Further, the throttle valve is driven with a throttle motor 22b so as to change the throttle opening. The ECU 13 detects current throttle valve opening from the throttle valve opening signal sent from the opening encoder 22a, and transmits a throttle valve drive signal to the throttle motor 22b to set the throttle valve 22 with predetermined opening.

Figure 2:
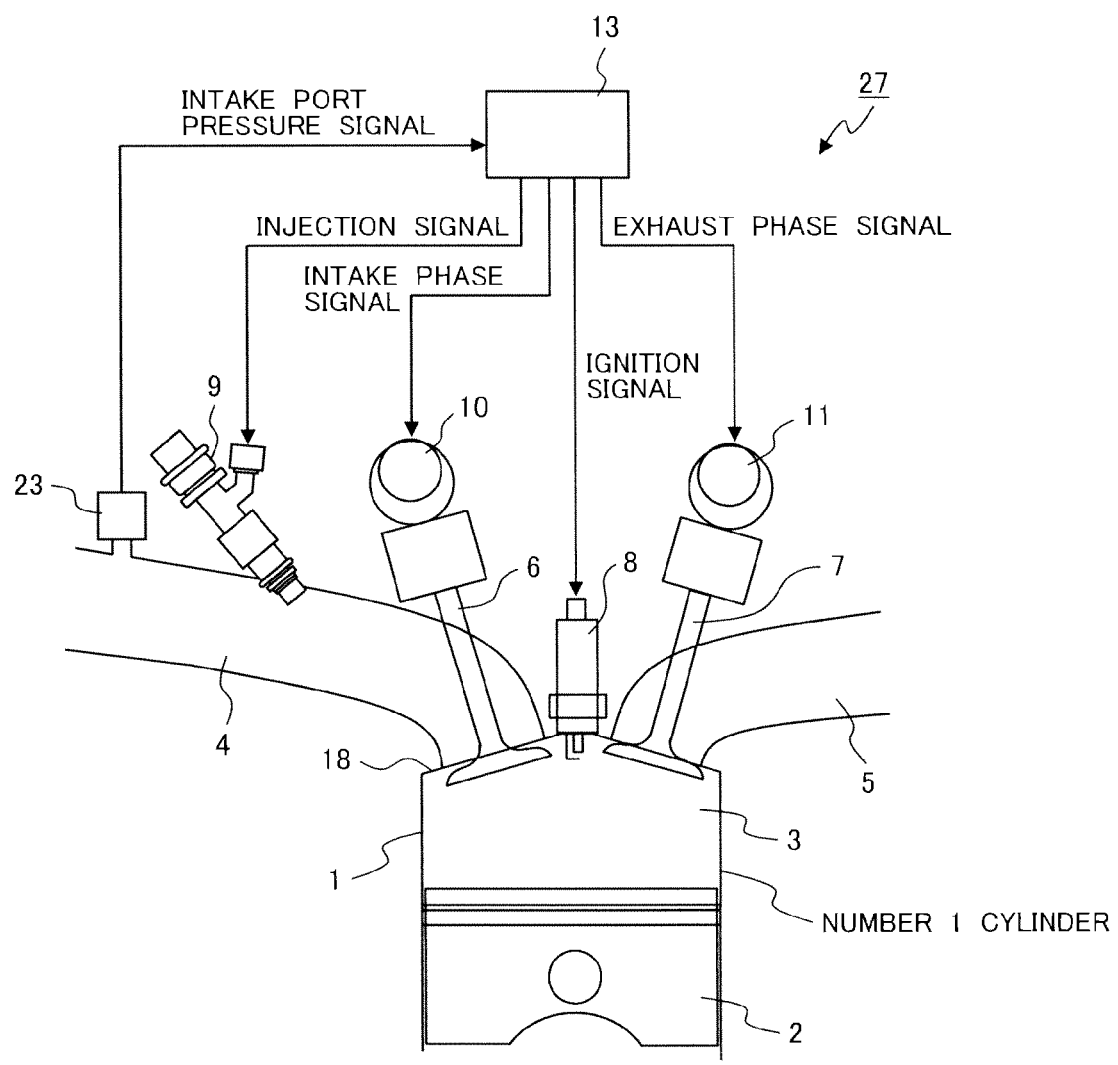
FIG. 2 is a cross-sectional diagram showing a schematic structure of the internal combustion engine.

FIG. 2 shows an example of a cross-section of a cylinder 27 of the internal combustion engine 50. In the cylinder 27, a combustion chamber 3 surrounded with a bore liner 1, a cylinder head 18, a piston 2, an intake valve 6 and an exhaust valve 7 is formed.

An ignition plug 8 is attached to approximately the center of the cylinder head 18. The ignition time with the ignition plug is set with an ignition signal sent from the ECU 13 to the ignition plug 8.

The phase of opening/closing timing of the intake valve 6 is continuously varied with an intake valve variable control mechanism 10. The phase of opening/closing timing is set based on an intake phase signal sent from the ECU 13 to the intake valve variable control mechanism 10.

Further, the phase of opening/closing timing of the exhaust valve 7 is continuously varied with an exhaust valve variable control mechanism 11. The phase of opening/closing timing is set based on an exhaust phase signal sent from the ECU 13 to the exhaust valve variable control mechanism 11.

The injector 9 is attached such that its nozzle shaft direction is directed to the intake opening of the cylinder head 18. The injector 9 injects fuel pressurized to e.g. 300 kPa to 700 kPa in spray form into the intake port 4. The Sauter mean diameter (SMD) of the spray generated with the injector 9 is e.g. 20 to 50 μm. The initial velocity of the spray is e.g. 10 to 20 m/S. The timing of fuel injection from the injector and injection period are set based on an injection signal sent from the ECU 13 to the injector 9.

The internal combustion engine according to the present embodiment having the above constituent elements is a spark ignition type 4 cycle (intake, compression, expansion and exhaust) internal combustion engine.

Figure 3:
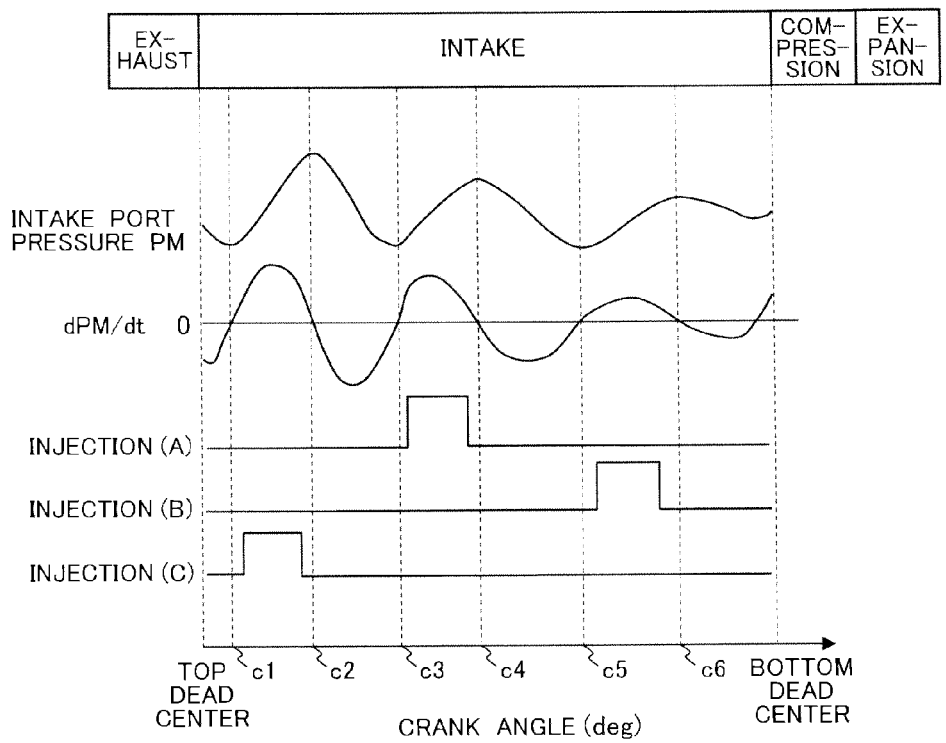
FIG. 3 is a timing chart showing injection time according to the first embodiment.

FIG. 3 is an example of timing chart explaining the injection time according to the present embodiment. In the timing chart, in the engine cycle of intake, compression, expansion and exhaust, only the intake stroke of the number 1 cylinder is extracted.

Intake port pressure PM indicates a cycle-averaged value of the intake port pressure of the number 1 cylinder detected with the intake port pressure sensor 23. The cycle-averaged value is a mean value obtained by a so-called arithmetic mean by division by the number of cycles obtained by adding several cycles of pressure or by other methods. Further, reference symbol dPM/dt indicates a time differential value of the intake port pressure PM. Examples of the method for obtaining the intake port pressure PM and the pressure differential value dPM/dt will be described later.

Ignition time (A), ignition time (B) and ignition time (C) are preferable injection timing candidates of the number 1 cylinder according to the present embodiment. These preferable injection timing candidates are selected so as to be included in a period where the pressure differential value dPM/dt is a positive value. That is, during the intake stroke in the present embodiment, crank angles c1 to c2, c3 to c4 and c5 to c6 are within the period where the pressure differential value dPM/dt is a positive value. The crank angle is varied in accordance with the pressure differential value dPM/dt.

Accordingly, at the injection time (A), injection is started on the delay angle side from the crank angle c1 and the injection is terminated on the advance angle side from the crank angle Cc2.

Further, at the injection time (B), injection is started on the delay angle side from the crank angle c3, and the injection is terminated on the advance angle side from the crank angle c4.

Further, at the injection time (C), injection is started on the delay angle side from the crank angle c5, and the injection is terminated on the advance angle side from the crank angle c6.

In the present embodiment, since there are three preferable injection time candidates (A), (B) and (C), one injection period is selected from them and fuel injection from the number 1 cylinder is performed. The method for selecting one injection period from the preferable injection time candidates will be described later.

In this manner, in the present embodiment of the present invention, fuel injection is performed during a period where the intake port pressure differential value during the intake stroke is a positive value, i.e., during a period where the intake port pressure during the intake stroke is increased.

Note that the state of the intake port pressure fluctuation changes in accordance with the number of cylinders of the engine, the opening/closing timings of the intake value and the exhaust valve, the engine load, the number of revolutions and the like. Accordingly, the preferable injection timing and the number of preferable injection timing candidates change in accordance with these conditions. Accordingly, the intake port pressure change around the cycle to determine the injection time is grasped, and the injection time is determined in correspondence with the pressure change.

Figure 4:
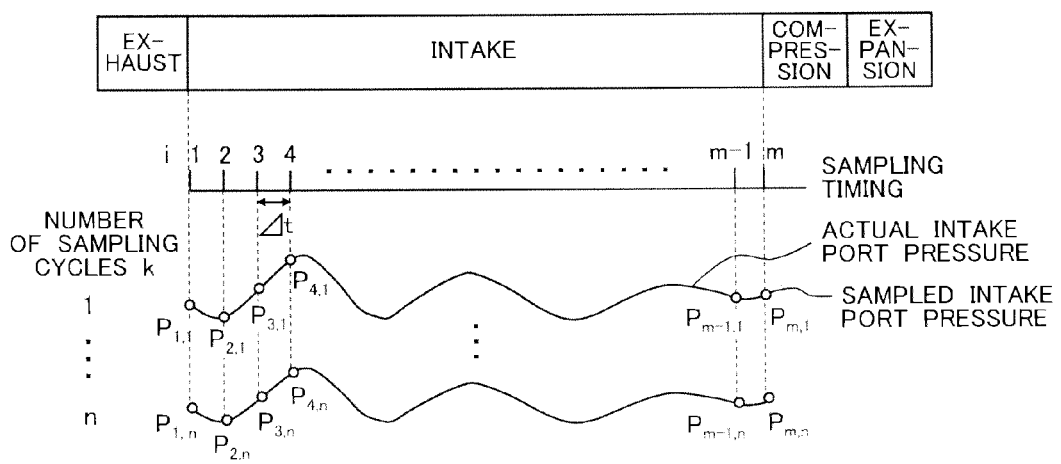
FIG. 4 is a timing chart explaining a method for reading intake port pressure data from an intake port pressure sensor into an ECU according to the first embodiment.

FIG. 4 shows an example of the method for reading the intake port pressure data into the ECU from the intake port pressure sensor 23 of the internal combustion engine according to the present embodiment.

The intake port pressure data is read from the intake port pressure sensor 23 into the ECU by a predetermined period $\Delta t$. The period $\Delta t$ is sufficiently shorter than the pulse period of the intake port pressure so as to capture the pulse of the intake port pressure. For example, the period $\Delta t$ is 1 ms. That is, m intake port pressure sampling data per one 1 cycle of intake stroke, for n cycles, are stored in memory array region, $P(1,1), P(2,1), \ldots, P(m,1), \ldots, P(1,n), P(2,n), \ldots,$ to $P(m,n)$.

The number of cycles n is appropriately determined based on the number of cylinders of the engine, the opening/closing timings of the intake valve and the exhaust valve, the load on the engine, the number of revolutions and the like.

Further, in the present embodiment, the intake port pressure is read from the intake port pressure sensor 23 into the ECU by the predetermined period $\Delta t$, in addition, it may be arranged such that the intake port pressure is read from the intake port pressure sensor 23 into the ECU by a predetermined angle $\Delta\theta$. It is possible to obtain more accurate intake port pressure data by reading the data by the predetermined angle $\Delta\theta$.

Figure 5:
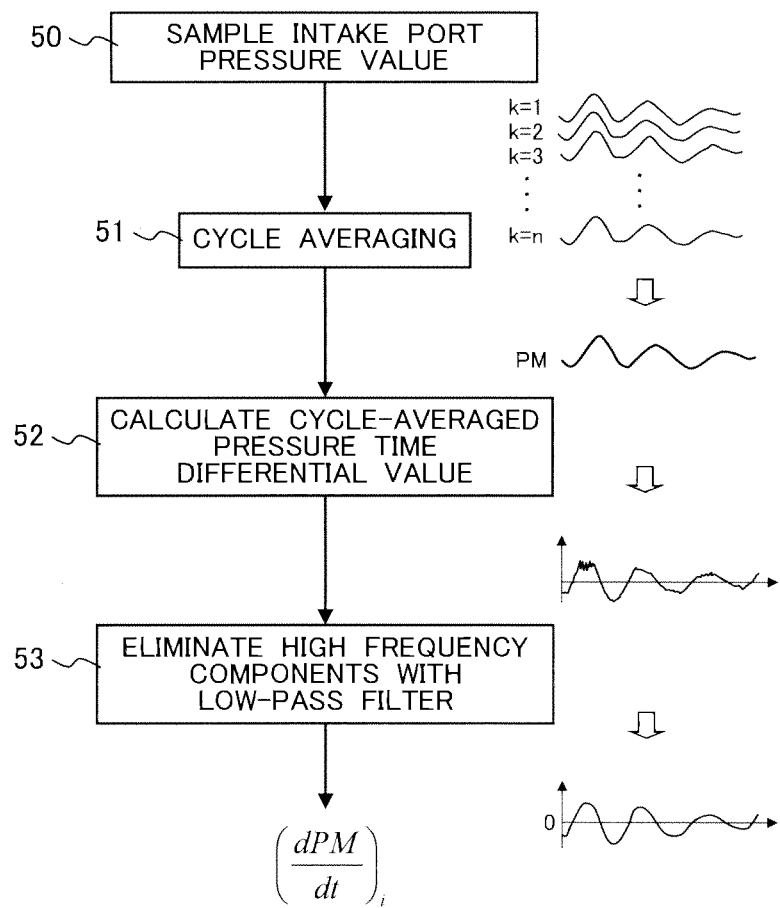
FIG. 5 is an explanatory diagram showing a procedure of obtaining intake port pressure cycle-averaged value and an intake port pressure differential value according to the first embodiment.

FIG. 5 shows an example of the procedure of obtaining an intake port pressure cycle-averaged value and an intake port pressure differential value in the ECU according to the first embodiment.

First, at step 50, the intake port pressure data is stored into the memory array region P(m,n) in the ECU by the above described intake port pressure sampling method.

Next, at step 51, cycle-averaged intake port pressure PM(i) is calculated with the following expression 1.

$$PM_i = \frac{\sum_{k=1}^{n} P_{i,k}}{n} \quad \text{[Expression 1]}$$

The intake port pressure is cycle-averaged in this manner so as to eliminate minute cycle fluctuation components accompanying operation condition change and environmental change, to more accurately obtain the essential fluctuation component of the intake pulse.

Further, at step 52, cycle-averaged intake port pressure differential value dPMr/dt (i) is calculated with the following expression 2.

$$\left(\frac{dPM_r}{dt}\right)_i = \frac{PM_{i+1} - PM_i}{\Delta t} \quad \text{[Expression 2]}$$

Finally, at step 53, the intake port pressure differential value dPM/dt (i) in which high frequency fluctuation components are eliminated with a low pass filter is obtained. The high frequency fluctuation components are eliminated with the low pass filter in this manner so as to prevent oscillation of the intake port pressure differential value at short period due to noise or the like of the measured value.

Note that the cut off frequency of the low pass filter is desirably triple to quintuple of the intake pulse frequency. A too high cut off frequency is not sufficient to eliminate high frequency components due to noise or the like. A too low cut off frequency eliminates the essential fluctuation components of the pulse. These frequencies cause erroneous determination of appropriate injection timing with respect to the pulse.

Since the pulse frequency changes in accordance with engine revolution velocity, it is desirable that the cut off frequency is changed in correspondence with the number of revolutions. Preferably, at the revolution velocity of e.g., 1000 rpm, the cut off frequency is set to 500 Hz, and on the other hand, at the revolution velocity of e.g., 2000 rpm, the cut off frequency is set to 1000 Hz. In this manner, by changing the cut off frequency in correspondence with the number of revolutions, it is possible to prevent erroneous determination of appropriate injection timing due to noise or the like.

Figure 6:
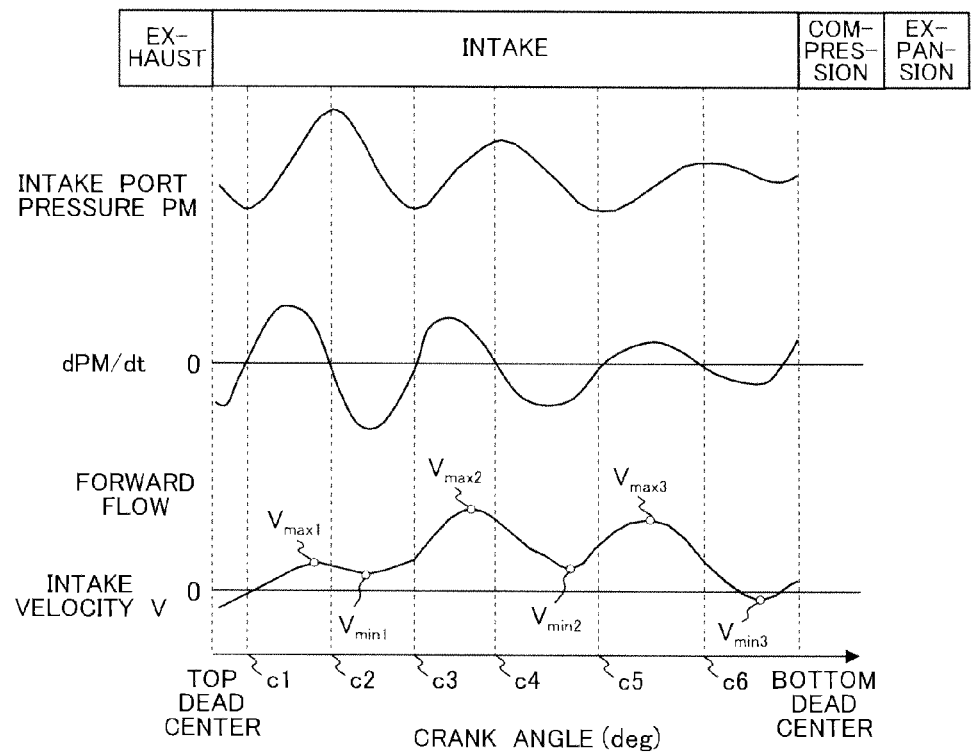
FIG. 6 is a timing chart explaining behaviors of a cycle-averaged intake port pressure PM, a differential value dPM/dt of the cycle-averaged intake port pressure and average intake velocity V in the intake port, at the intake stroke according to the first embodiment.

FIG. 6 shows an example of the cycle-averaged intake port pressure PM during the intake stroke, the cycle-averaged intake port pressure differential value dPM/dt, and the average intake velocity V in the intake port, according to the present embodiment.

Figure 7:
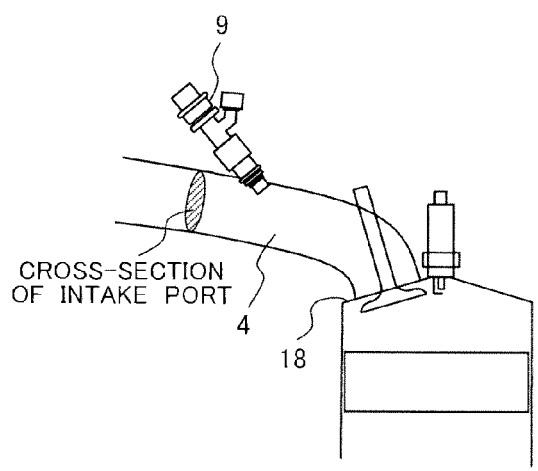
FIG. 7 is a cross-sectional diagram of the intake port when the average intake velocity V in the intake port is obtained.

Note that as shown in FIG. 7, the average intake velocity V in the intake port is a value obtained by averaging the gas velocity in the intake port by an intake port cross section. When the average intake velocity V is a positive value, it indicates a forward flow where the gas flows from the intake port toward the engine cylinder. On the other hand, when the average intake velocity V is a negative value, it indicates a reverse flow where the gas flows from the engine cylinder toward the intake port.

As shown in the example of FIG. 6, in accordance with the fluctuation of the intake port pressure PM, the intake velocity V fluctuates at approximately the same period as that in the case of the intake port pressure. In the present embodiment, at the intake velocity V, three maximum values Vmax1, Vmax2 and Vmax 3 appear during the intake stroke. Further, at the intake velocity V, three minimum values Vmin1, Vmin2 and Vmin3 appear during the intake stroke.

The three maximum values Vmax1, Vmax 2 and Vmax 3 appear during a period where the intake port pressure differential value dPM/dt is a positive value. On the other hand, three minimum values Vmin1, Vmin2 and Vmin3 appear during a period where the intake port pressure differential value dPM/dt is a negative value. This is because of the following reason.

The gas flow in the intake port is caused by the difference between the pressure in the intake port and the pressure in the cylinder. Accordingly, when the intake velocity is "0", the difference between the pressure in the intake port and that in the cylinder is almost "0".

When the intake port pressure begins to rise with the intake pulse, it is higher than the pressure in the cylinder, and the intake velocity is higher. In accordance with the increase in the intake velocity, the cylinder is filled with a large amount of gas, then the pressure in the cylinder is increased. Then, in spite of increase in the intake port pressure, the difference between the pressure in the intake port and that in the cylinder becomes small, then the intake velocity is decreased. At this time, the intake velocity is a maximum value.

Then, when the intake port pressure begins to decrease with the intake pulse, the difference between the pressure in the intake port and that in the cylinder is further decreased, and the intake velocity is further lowered. When the intake port pressure becomes lower than that in the cylinder, the gas reverse flows from the cylinder into the intake port, and the intake velocity becomes a negative value. In a case where the intake port pressure does not become lower than the pressure in the cylinder with the intake pulse, the gas reverse flow does not occur and the positive value of the intake velocity is maintained.

When the intake velocity is decreased or the intake reverse flow occurs, as a sufficient amount of gas is not supplied with respect to the piston decent amount in the cylinder, the pressure in the cylinder is lowered. Then the difference between the pressure in the intake port and that in the cylinder becomes bigger in spite of the decrease in the intake port pressure. The intake velocity becomes acceleration. At this time, the intake velocity becomes a minimum value.

As described above, a phase sift occurs between the intake port pressure change and the intake velocity change by interaction between the intake port pressure change due to the intake pulse and the cylinder pressure change due to the expansion of cylinder internal volume. As a result, the maximum value of the intake velocity appears during a period where the intake port pressure is rising, i.e., during a period where the intake port pressure differential value dPM/dt is a positive value. On the other hand, the minimum value of the intake velocity appears during a period where the intake port pressure is decreasing, i.e., during a period where the intake port pressure differential value dPM/dt is a negative value.

As the maximum value and the minimum value of the intake velocity occur as described above, it is possible to determine the state of the gas flow in the intake port as follows based on whether the intake port pressure differential value dPM/dt is a positive value or a negative value.

During the period where the intake port pressure differential value dPM/dt is a positive value, the intake reverse flow (reverse flow from the cylinder to the intake port) does not occur, and the intake velocity is comparatively high. On the other hand, during the period where the intake port pressure differential valued PM/dt is a negative value, the intake reverse flow (reverse flow from the cylinder to the intake port) may occur, and the intake velocity is comparatively low.

In the present embodiment, the fuel is injected during the period where the intake port pressure differential value dPM/ dt is a positive value (see FIG. 3). This means that the fuel is injected during the period where the intake reverse flow does not occur, and the intake velocity is comparatively high.

Figure 8:
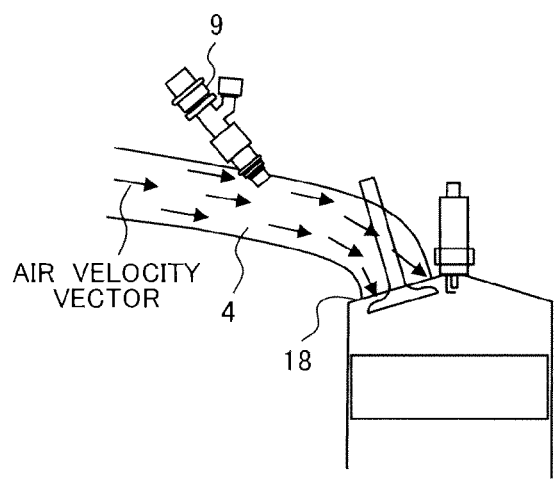
FIG. 8 is a cross-sectional diagram showing an air velocity vector in the intake port when intake port pressure differential value >0 holds.
Figure 9:
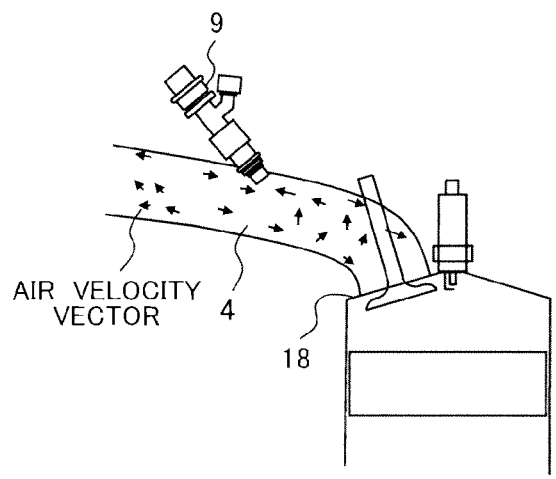
FIG. 9 is a cross-sectional diagram showing the air velocity vector in the intake port when the intake port pressure differential value <0 holds.

FIGS. 8 and 9 show an example of the air velocity vector in the intake port during the intake stroke in the present embodiment.

FIG. 8 shows an example of the air velocity vector during a period where the intake port pressure differential value dPM/dt>0 holds. During the period where the intake port pressure differential value dPM/dt>0 holds, since the difference between the pressure in the intake port and that in the cylinder is comparatively great, a comparatively fast intake flow from the intake port toward the cylinder occurs in the uniform entire intake port.

FIG. 9 shows an example of the air velocity vector during the period where the intake port pressure differential value dPM/dt<0 holds. During the period where the intake port pressure differential value dPM/dt<0 holds, as the difference between the pressure in the intake port and that in the cylinder is small, the gas velocity in the intake port is low. Further, as the flow stagnating, the direction of the flow in the intake port is not uniform, and even though the average intake velocity is a positive value (forward flow), a reverse flow may locally occur.

Figure 10A:
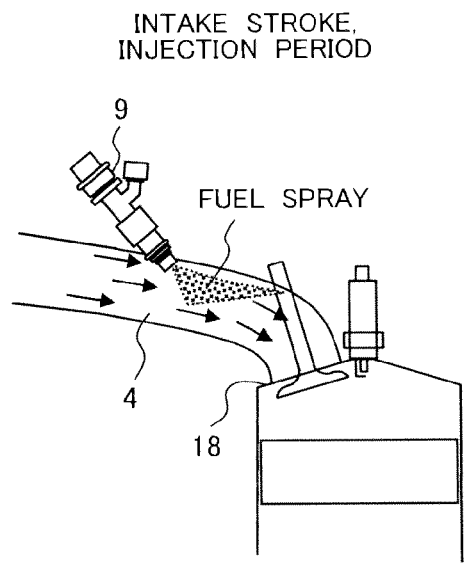
FIG. 10A is an explanatory diagram of the air velocity vector and fuel behavior in the intake port upon fuel injection in a period where the intake port differential value >0 holds.
Figure 10B:
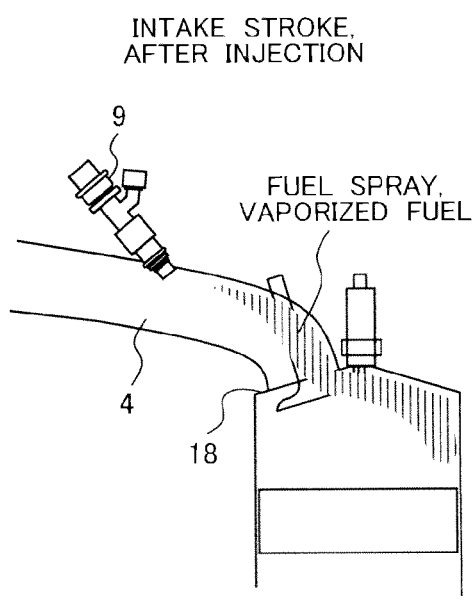
FIG. 10B is an explanatory diagram of the air/fuel behavior in the intake port upon fuel injection in the period where the intake port differential value >0 holds.
Figure 10C:
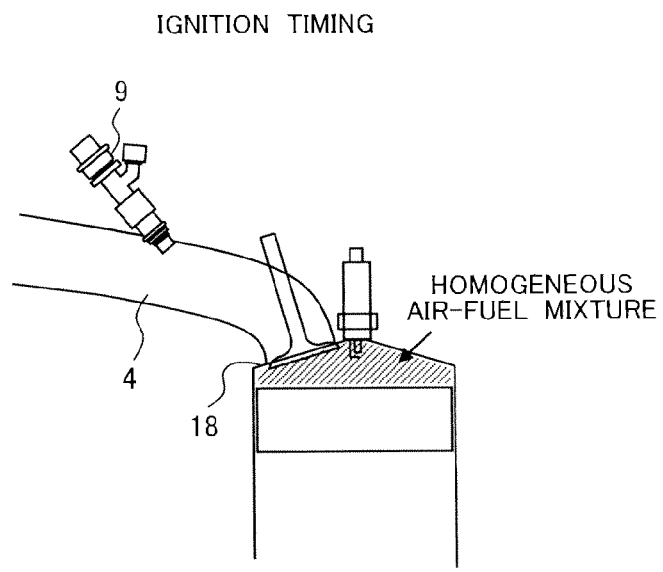
FIG. 10C is an explanatory diagram of the fuel behavior in the combustion chamber upon fuel injection in the period where the intake port differential value >0 holds.

FIGS. 10 and 11 show an example of the air velocity vector and the fuel behavior in the intake port during the intake stroke according to the present embodiment.

Figure 11A:
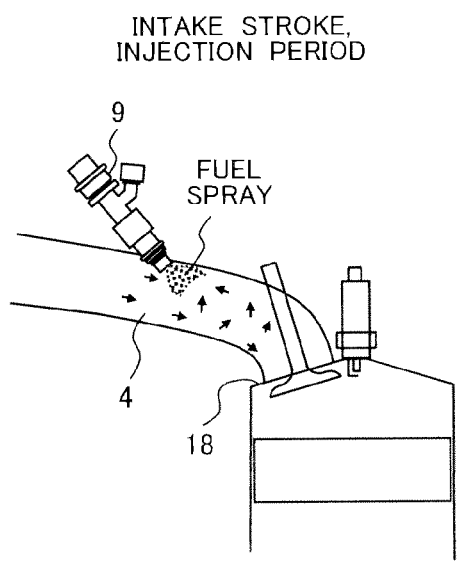
FIG. 11A is an explanatory diagram of the air velocity vector and the fuel behavior in the intake port upon fuel injection in the period where the intake port pressure differential value <0 holds.
Figure 11B:
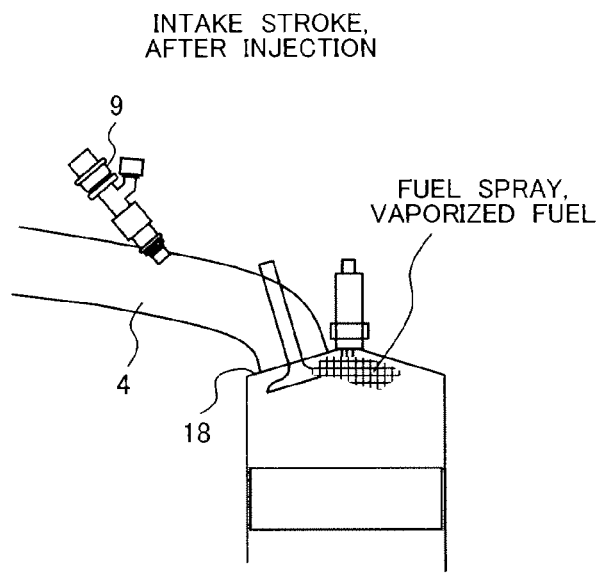
FIG. 11B is an explanatory diagram of the air/fuel behavior in the intake port upon fuel injection in the period where the intake port pressure differential value <0 holds.

FIG. 10 shows an example of the air velocity vector and the fuel behavior in the intake port when the fuel is injected during the period where the intake port pressure differential value dPM/dt>0 holds. FIG. 11A shows an example of the fuel injection period during the intake stroke; FIG. 11B, an example of a status after the fuel injection during the intake stroke; and FIG. 11C, an example of ignition timing.

During the period where the intake port pressure differential value dPM/dt>0 holds, the comparatively fast intake flow from the intake port toward the cylinder occurs uniformly in the entire intake port. Accordingly, the fuel spray injected from the injector is brought with the intake flow in the downstream direction from the intake port.

As the fuel spray is dispersed with the flow in the intake port, after the termination of the fuel injection, the fuel spray and vaporized fuel are widely distributed from the intake port to the cylinder as shown in FIG. 11B. In this manner, as the fuel in the state where it is widely dispersed in the space is inhaled in the cylinder, the mixture of the air and the fuel is promoted. At ignition timing, homogeneous air-fuel mixture as shown in FIG. 11C is formed.

When this homogeneous air-fuel mixture is ignited with an ignition plug, excellent combustion is performed, and it is possible to realize improvement in the gas mileage and toxic gas (HC, CO or the like) exhaust reduction.

Figure 11C:
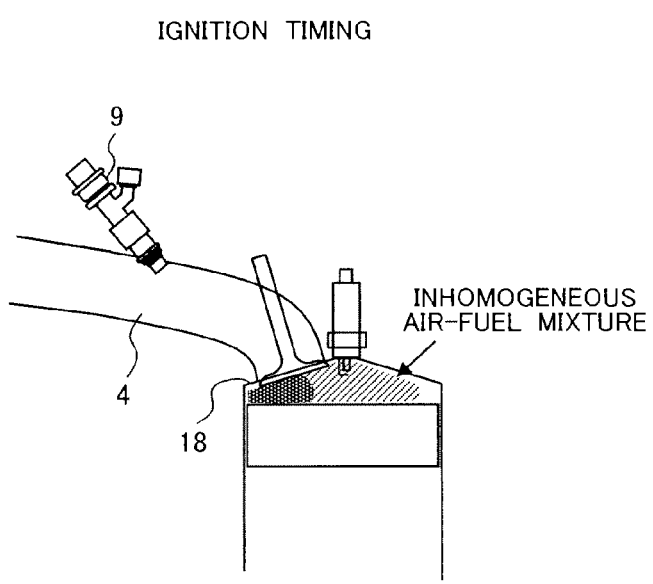
FIG. 11C is an explanatory diagram of the fuel behavior in the combustion chamber upon fuel injection in the period where the intake port pressure differential value <0 holds.

FIGS. 11A to 11C show an example of the air velocity vector and the fuel behavior in the intake port when the fuel is injected during the period where the intake port pressure differential value dPM/dt<0 holds. FIG. 11A shows the fuel injection period during the intake stroke; FIG. 11B, an example of a status after the termination of the fuel injection during the intake stroke; and FIG. 11C, an example of the ignition timing.

During the period where the intake port pressure differential value dPM/dt<0 holds, the intake velocity in the intake port is low, and the velocity distribution is inhomogeneous. Accordingly, the fuel spray injected from the injector is almost not carried to the downstream from the intake port with the intake flow. Further, when a reverse flow locally occurs in the vicinity of the injection hole of the injector, the reverse flow suppresses the advance of the fuel spray to the downstream from intake port. Accordingly, during the injection period, the fuel spray stays in the vicinity of the injection hole of the injector. Further, there is a probability that this reverse flow carries the spray to the upstream from the intake port, and fuel spray collides against the intake port wall surface and the injector. The attachment of the fuel causes increase in the port wall flow and deteriorates fuel consumption and exhaust.

After the fuel injection, the fuel spray and vaporized fuel are brought with the intake flow into the cylinder. During the injection period, as the fuel spray has stayed in the vicinity of the injector injection hole, the fuel is not sufficiently dispersed in the intake port. As shown in FIG. 11(B), the fuel flows in the cylinder in massive form. Since the fuel in a locally concentrated status is inhaled in the cylinder, the air and the fuel are not sufficiently mixed. At the ignition timing, inhomogeneous air-fuel mixture as shown in FIG. 11(C) is formed.

When this inhomogeneous air-fuel mixture is ignited with the ignition plug, a part of the fuel does not sufficiently combust. The fuel consumption is degraded or toxic gas (HC, CO or the like) exhaust is increased.

Figure 12:
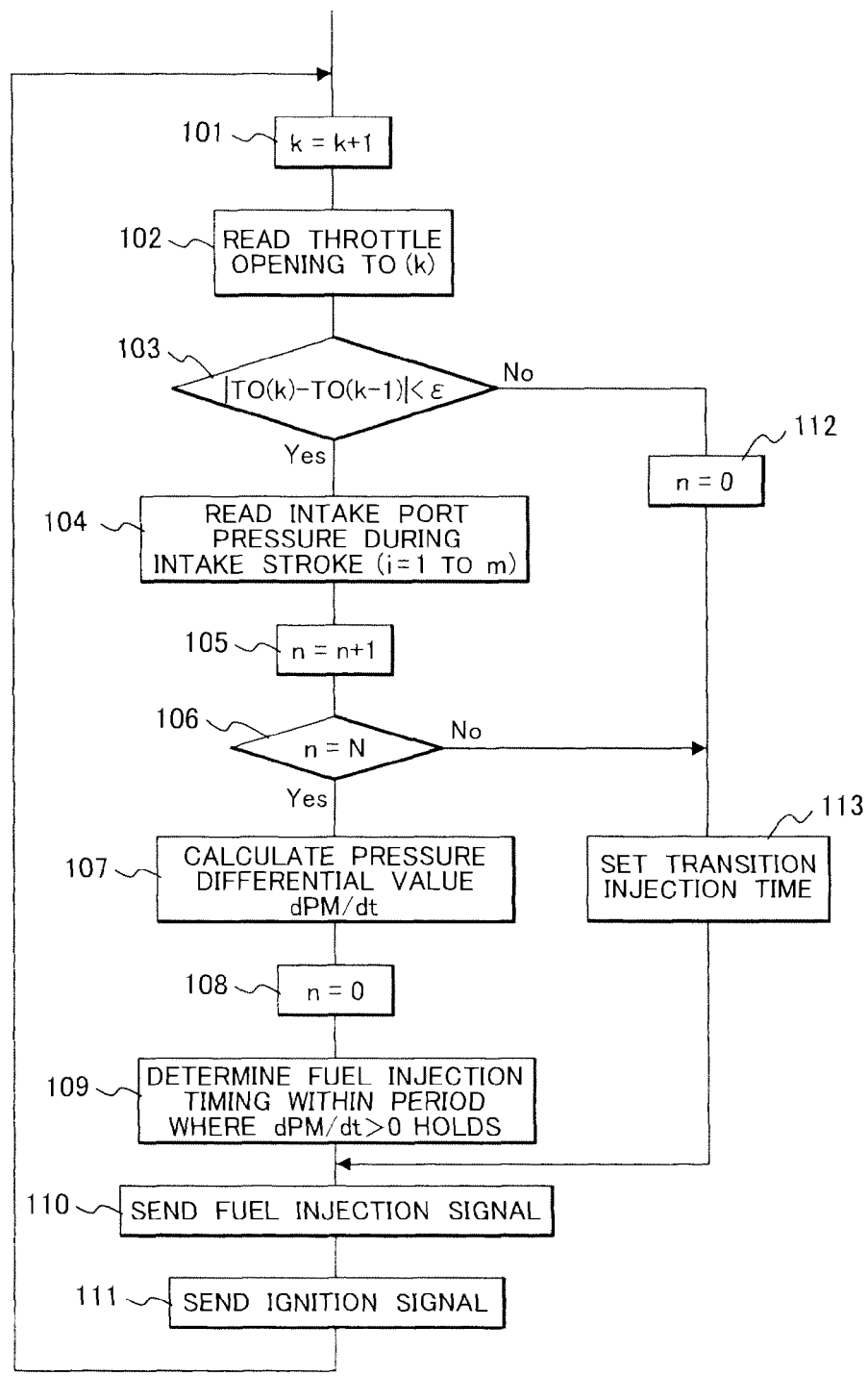
FIG. 12 is a flowchart showing a fuel injection timing determination procedure according to the first embodiment.

It is apparent from these facts that it is desirable to perform fuel injection during the period where the intake port pressure differential value dPM/dt>0 holds. FIG. 12 is a flowchart showing a fuel injection timing determination procedure in the ECU 13 according to the first embodiment.

At step 101, a counter value k indicating the number of engine cycles is updated, then at step 102, throttle opening TO(k) in the current cycle is read. Next, at step 103, the throttle opening TO(k) in the current cycle and the throttle opening TO(k−1) in the previous cycle are compared with each other.

At step 103, when the throttle opening difference in 1 cycle is less than a predetermined value e, it is determined that the current operation status is maintained as a steady status, then the intake port pressure differential value dPM/dt(i) is obtained at step 104 to step 107. The method for obtaining the intake port pressure differential value dPM/dt(i) is as described above using FIG. 5.

Note that at step 105 and step 106, processing to obtain the cycle-averaged intake pressure data is performed. Each time the intake port pressure is read, the counter value is incremented by +1. The processing is performed until the counter value indicates a predetermined number of cycles N.

Then, the intake port pressure differential value dPM/dt(i) is obtained at step 107. Thereafter, the counter value is cleared to "0", then the process proceeds to the next step. At step 109 where the intake port pressure differential value dPM/dt obtained, the injection timing of the number 1 cylinder is determined in a period where the intake port pressure differential value dPM/dt(i)>0 holds. Thereafter, at step 110, a fuel injection signal is transmitted to the fuel injection valve 9, and then the ignition signal is transmitted so as to perform fuel combustion.

Returning to step 103, when the throttle opening difference in one cycle is greater than the predetermined value e, it is determined that the current status is a transition operation status. Then the process proceeds to step 113, to set a transition injection time. The transition injection time is set by e.g. reading prepared map data.

According to the present embodiment, only the number 1 cylinder is provided with the intake pressure sensor. Accordingly, the injection timing of other cylinder than the number 1 cylinder is obtained by adding a predetermined phase difference to the injection timing of the number 1 cylinder. For example, in the case of a general 4 cylinder engine, the explosion interval in each cylinder is 180° crank angle. In the 4 cylinder engine, the order of explosion in the respective cylinders is the number 1 cylinder, the cylinder No. 3, the cylinder No. 4 and the cylinder No. 2, the injection time of the cylinder No. 3 is obtained by adding the 180° crank angle to the injection time of the number 1 cylinder. The injection time of the cylinder No. 4 is obtained by adding 360° crank angle to the injection time of the number 1 cylinder. Further, the injection time of the cylinder No. 2 is obtained by adding 540° crank angle to the injection time of the number 1 cylinder. Note that the intake pressure change characteristic may differ by cylinder (each cylinder's habit). In this case, the data of the intake pressure sensor provided in the number 1 cylinder is corrected.

Figure 20:
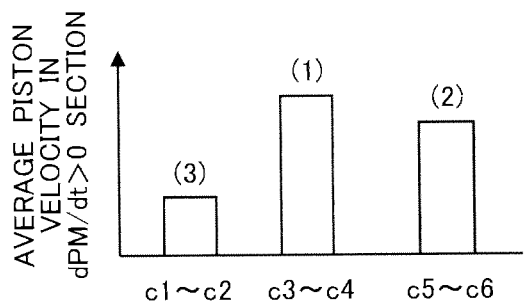
FIG. 20 is an explanatory diagram of an average piston velocity in the period where the intake port pressure differential value >0 holds according to the second embodiment.

FIG. 20 shows an example of the map data of transition injection time according to the present embodiment. The injection timing is stored in the storage region of the ECU as map data corresponding to the number of engine revolutions, a required torque, and cooling water temperature. The transition injection time is obtained by referring to the map data.

Further, the transition injection time set here is desirably set during the exhaust stroke or the compression stroke, or the expansion stroke.

The threshold value $\epsilon$ of the inter-cycle deviation for the throttle opening used at step 103 is set to a sufficiently small value. When the throttle opening greatly fluctuates between cycles, the pressure in the intake port changes by the change of throttle valve squeezing effect in the throttle valve. When the pressure change with the throttle valve and the pressure change with the intake pulse overlap with each other, an error occurs in the estimation of intake velocity using the intake port pressure differential value.

Figure 14:
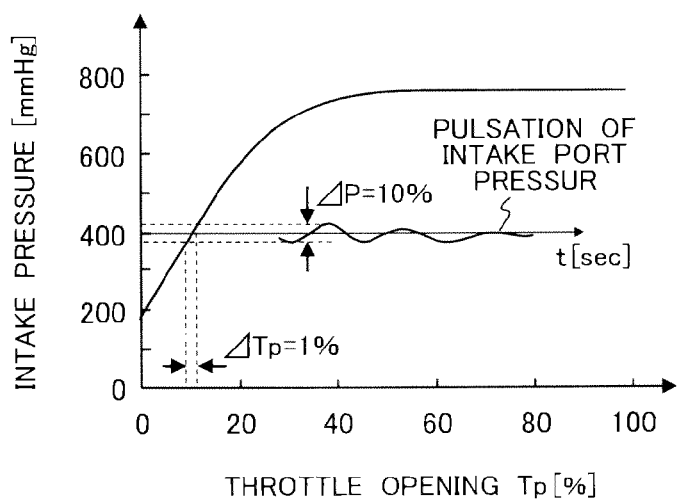
FIG. 14 is a characteristic diagram showing typical relation between throttle opening and the intake port pressure.

FIG. 14 shows an example of the relation between the throttle opening and the intake pressure, and shows an example of a typical intake port pressure pulse.

The change width of the intake port pressure caused by the typical intake pulse is approximately 10% or greater with respect to average pressure. In a low and intermediate load regions, the 10% change of the intake port pressure corresponds to the intake pressure change when the throttle opening changes by approximately 1% with respect to the full opening. Accordingly, the pressure change with the throttle valve and the pressure change with the intake pulse overlap with each other, and an error occurs in the estimation of the intake velocity using the intake port pressure differential value when the throttle valve opening changes by 1% or more between the cycles. Accordingly, the threshold value $\epsilon$ of the inter-cycle deviation of the throttle opening is desirably 1% or less with respect to the full opening.

The fuel injection during the intake stroke is much influenced by the intake flow. Accordingly, when the injection time is erroneously set during the intake reverse flow period or a period where the intake flow velocity low, the fuel-air mixture may be insufficient, or attachment of fuel to the wall surface may be increased.

Figure 13:
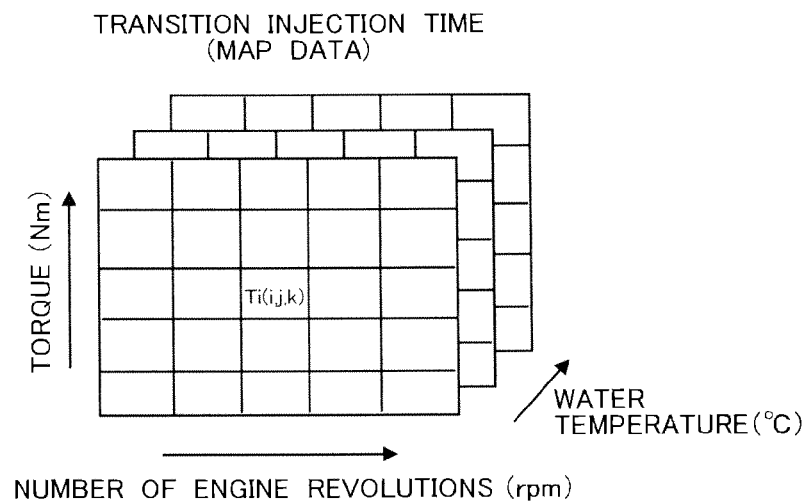
FIG. 13 is an explanatory diagram of the structure of map data for transition injection time according to the first embodiment.

In the present embodiment, when the inter-cycle fluctuation of the throttle opening is less than the predetermined value $\epsilon$, the injection timing during the intake stroke is determined by using the intake port pressure differential value. When the inter-cycle fluctuation of the throttle opening is greater than the threshold value $\epsilon$, the injection time is determined from the map data as shown in FIG. 13. With this arrangement, it is possible to prevent incomplete combustion and exhaust emission deterioration in transition time.

As described above, in the present embodiment, in a period where the intake port pressure differential value during the intake stroke is a positive value, i.e., in a period where the intake port pressure during the intake stroke is increased, the start and termination of fuel injection are performed. With this arrangement, the gas flow velocity in the intake port is comparatively fast during the injection period. With this fast intake flow, the fuel spray is widely dispersed in the intake port during the fuel injection period, and homogeneous air-fuel mixture is formed in the cylinder at ignition timing. As a result, excellent combustion is performed, and it is possible to realize improvement in the fuel consumption efficiency and reduction of toxic gas (HC or CO) exhaust.

Further, since the fuel is injected in a period where the intake port pressure during the intake stroke is increased, it is possible to avoid fuel injection in a reverse flow period in the intake port. With this arrangement, it is possible to prevent attachment of the fuel to the port wall surface to form a wall flow with the reverse flow.

Note that as the fuel is injected in a period where the intake port pressure during the intake stroke is increased, even when the average velocity in the intake port is a positive value (forward flow), it is possible to avoid fuel injection in a period where the flow is weak and a reverse flow locally occurs in the intake port. For example, in a hot wire type intake velocity sensor, positioned around the center of the intake port, to measure the intake flow velocity in this position tends to erroneously detect this local reverse flow as a forward flow and set the injection time. On the other hand, in the method shown in the present embodiment, it is possible to infallibly avoid the fuel injection in a local reverse flow period.

In the present embodiment, as a period where intake port pressure differential value dPM/dt(i)>0 holds (hereinbelow, preferable injection period), there are three candidates, injection (A), injection (B) and injection (C). One of these candidates is selected as an injection period and the fuel injection is performed (see FIG. 3).

In the present embodiment, it is possible to further promote the dispersion of the fuel spray in the injection period by the intake flow by injecting the fuel at timing where the intake velocity is higher. Accordingly, it is desirable to select an injection period where the intake velocity is the fastest from the preferable injection period candidates.

Then an example of the method for selecting a more preferable injection period from the injection period candidates will be described using FIGS. 15 and 16.

Figure 15:
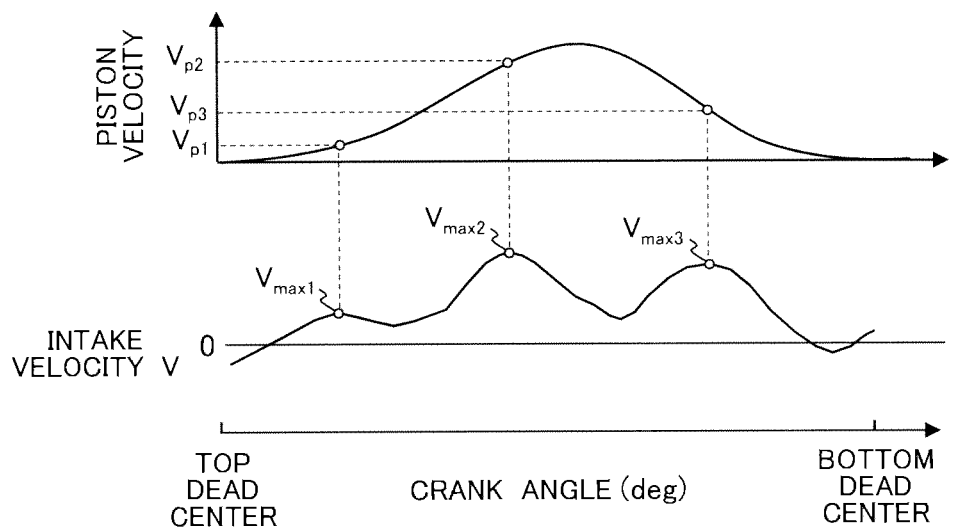
FIG. 15 is an explanatory diagram of the relation between the intake velocity V and a piston velocity Vp in a cylinder according to the first embodiment.

FIG. 15 shows an example of the relation between the intake velocity V and the cylinder piston velocity Vp in the present embodiment. The piston velocity is generally indicated with Expression 3. The velocity is zero in the top dead center and the bottom dead center, and is a maximum around an intermediate point between the top dead center and the bottom dead center.

$$V_p = -r\omega\sin(\omega t) + r^2\omega\frac{\sin(\omega t)\cos(\omega t)}{c^2 - r^2\sin^2(\omega t)} \qquad \text{[Expression 3]}$$

ω: crank angular velocity
γ: crank arm length
c: connecting rod length

As shown in FIG. 15, there is correlation between the intake velocity maximum value Vmax and the piston velocity Vp at the Vmax occurrence timing. More particularly, the intake velocity maximum values Vmax are Vmax2, Vmax3 and Vmax1 in the descending order. On the other hand, the piston velocities Vp at the timing of the respective intake velocity maximum values Vmax are Vp2, Vp3 and Vp1 in the descending order.

That is, it is possible, from the piston velocity at timing of generation of the intake velocity maximum value, to determine an intake velocity maximum value with which the intake velocity is the fastest.

In the present embodiment, as the fuel injection is performed in the vicinity of generation timing of the intake velocity maximum value, it is also possible from the piston velocity in the injection time to determine an injection period where the intake velocity is the fastest.

Figure 16:
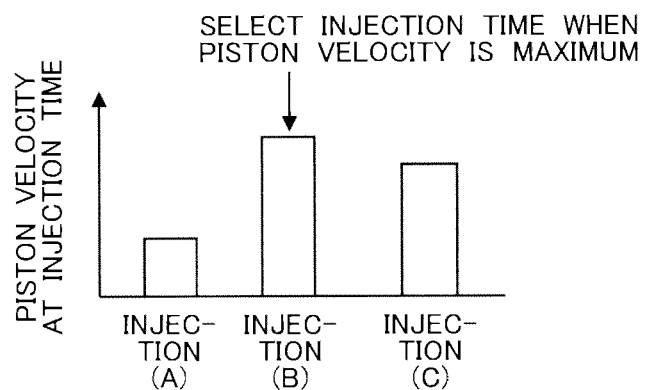
FIG. 16 is an explanatory diagram of the piston velocity in intermediate time (injection core time) in the injection period according to the first embodiment.

FIG. 16 shows an example where the piston velocity at intermediate time (injection core time) in the respective preferable injection period candidates (A), (B) and (C) is obtained using the Expression 3. When an injection period where the injection time piston velocity is the fastest is selected from these candidates, it is possible to perform injection at timing where the intake velocity is the fastest and to form more homogeneous air-fuel mixture in the cylinder.

Note that it may be arranged such that upon comparison between the piston velocities in the injection periods, instead of using the piston velocity at injection core time, the piston velocity at injection start time or injection termination time is obtained from the Expression 3 and is used.

Further, it may be arranged such that an average piston velocity obtained by averaging piston velocities at plural timings obtained from the Expression 3 is used. The average velocity more accurately indicates the relation among the intake velocities in the injection period. Among particularly preferable injection period candidates, when the difference of intake flow velocity is small, it is possible to more infallibly select optimum injection time.

Further, it may be arranged such that the relation between the crank angle and the piston velocity is previously obtained and a table is generated, and the table is referred to without using the Expression 3 to calculate the piston velocity. In this manner, by reference to the table, the calculation load in the ECU is reduced.

As shown in the above embodiment, when injection is performed such that all the injection period of injection during the intake stroke are included in a period where the intake port pressure differential value dPM/dt is a positive value, the dispersion of the spray in the intake port by the intake gas flow is the maximum, and the maximum homogeneous air-fuel mixture is formed.

Figure 17:
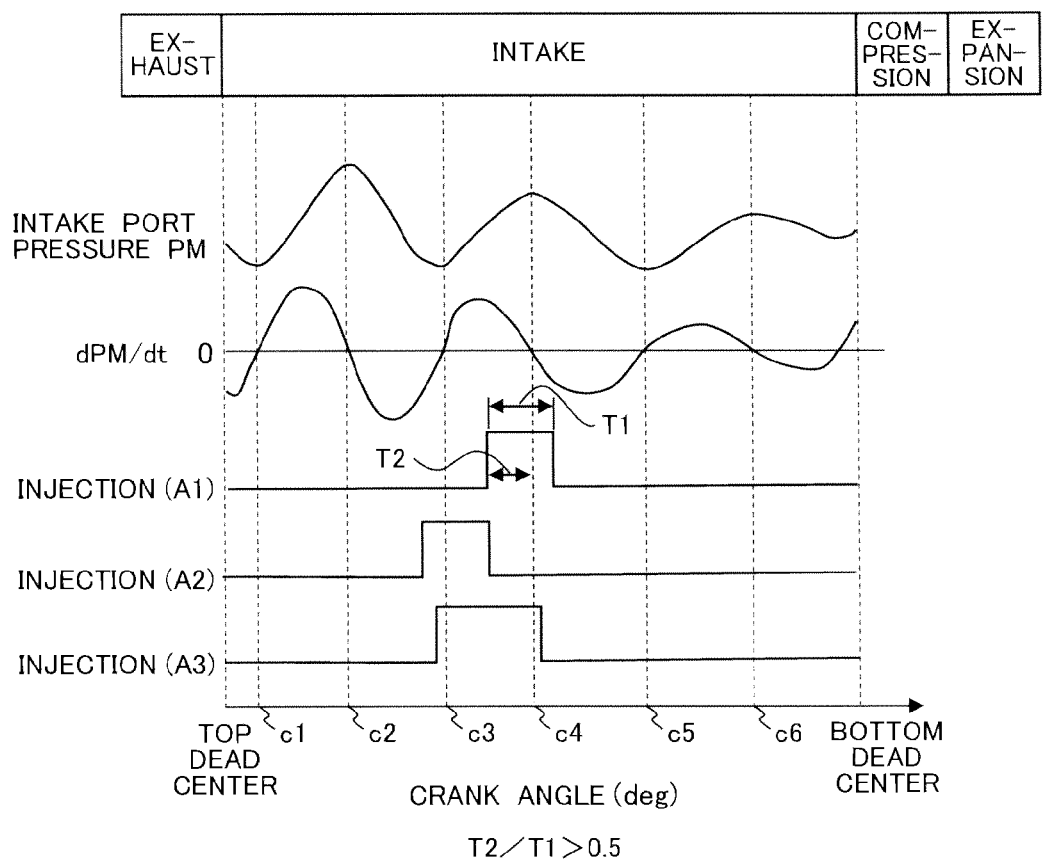
FIG. 17 is an explanatory diagram of an example of preferable injection period candidates in the first embodiment, explaining that a part of the injection period is out of the period where the intake port pressure differential value >0 holds.

However, as indicated with the injections (A1), (A2) and (A3) in FIG. 17, even when a part of the injection period is out of the period where the pressure differential value dPM/dt is a positive value, it is possible to disperse the spray in the intake port by the intake gas flow. As long as the injection period T2 in a period where the pressure differential value dPM/dt is a positive value with respect to all the injection period T1 during the intake stroke is a large majority (more than half), i.e., T2/T1>0.5 holds, as the amount of the fuel dispersed in the intake port by the intake gas flow is over the amount of the fuel dispersion of which is suppressed by reverse flow or stagnation in the intake port, it is possible to homogenize the air-fuel mixture.

Further, in accordance with increase in required torque and increase in the revolution velocity of the engine, when the injection period is not included in the period where the intake port pressure differential value dPM/dt is a positive value, the injection time is changed to that during other stroke than the intake stroke, e.g., during the exhaust stroke. Otherwise, as shown in another embodiment to be described later, the injection is allocated to another period where the intake port pressure differential value dPM/dt>0 holds.

Otherwise, as shown in another embodiment to be described later, the injection may be allocated to other stroke than the intake stroke, e.g. to the exhaust stroke and the intake stroke.

Second Embodiment

In the present embodiment, another example of fuel injection at optimum timing in correspondence with the level of gas flow velocity in the intake port will be described.

The internal-combustion engine according to the present embodiment is the same as that in the first embodiment, the explanation of the structure of the engine will be omitted.

Figure 18:
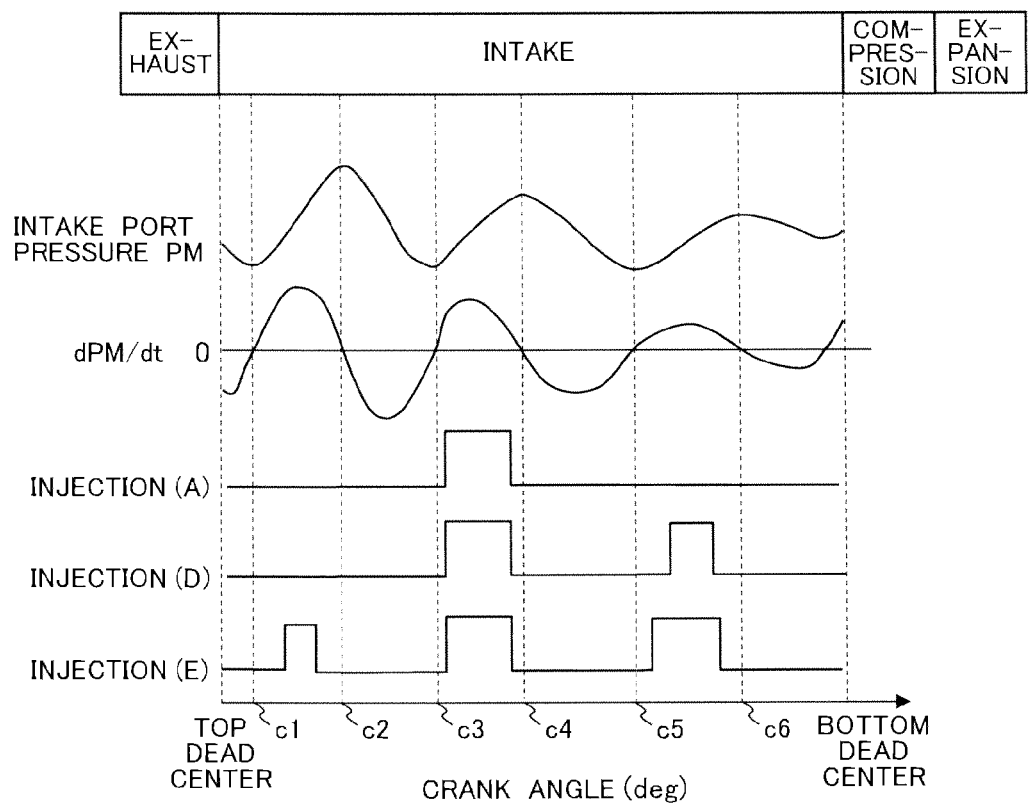
FIG. 18 is a timing chart explaining the injection time according to a second embodiment of the present invention.

FIG. 18 is an example of a timing chart explaining the injection time in the present embodiment. In the present timing chart, in an engine cycle of intake, compression, expansion and exhaust, only the intake stroke in the number 1 cylinder is extracted.

The intake port pressure PM indicates cycle-averaged intake port pressure in the number 1 cylinder detected with the intake port pressure sensor 23 in the internal combustion engine according to the present embodiment. Further, the intake port pressure differential value dPM/dt indicates a time differential value of the intake port pressure PM. The methods for obtaining the intake port pressure PM and the intake port pressure differential value dPM/dt are the same as those in the first embodiment.

The injection time (A), the injection time (D) and the injection time (E) are preferable injection timing candidates according to the present embodiment. These preferable injection timing candidates are selected such that they are within a period where the intake port pressure differential value dPM/dt is a positive value. That is, during the intake stroke according to the present embodiment, the crank angles C1 to C2, C3 to C4 and C5 to C6 are ranges where the intake port pressure differential value dPM/dt is a positive value.

Then the injection time (D) is obtained by adding the fuel injection in the range C5 to C6 to the injection time (A). Further, the injection time (E) is obtained by adding the fuel injection in the range C1 to C2 to the injection time (D). Accordingly, in one intake cycle, as the fuel amount, injection time (A)<injection time (D)<injection time (E) holds.

In the present embodiment, one of the injection time (A), the injection time (D) and the injection time (E) is selected based on the length of total injection period, i.e., torque required of the engine.

Figure 19:
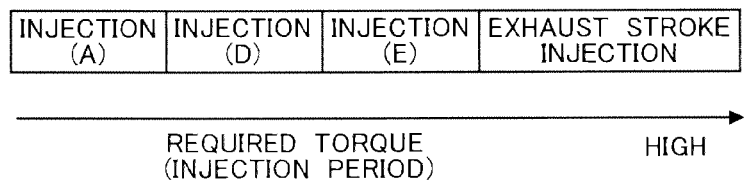
FIG. 19 is an explanatory diagram of injection time change method with respect to required torque according to the second embodiment.

FIG. 19 shows an example of injection time selection method with respect to the required torque. As shown in FIG. 19, in the present embodiment, in accordance with increase in the required torque, one of the injection time (A), the injection time (D) and the injection time (E) is sequentially selected.

When the required torque is low such that the fuel injection is performed within the period of crank angle c3 to c4, the injection time (A) is selected. Next, when the required torque is increased and the fuel injection period is closer to the crank width from c3 to c4 (e.g., injection period >(c4−c3)×0.9), the injection time (D) is selected, and the fuel injection for the torque increment is performed during the period of the crank angle c5 to c6.

When the required torque is further increased and the injection period between the crank angle c5 to c6 is closer to the crank width of c5 to c6 (e.g., injection period between c5 to c6>(c6−c5)×0.9), the injection time (E) is selected, and the fuel injection for the torque increment is performed during the period of the crank angle c1 to c2. When the torque is further increased, the residual fuel during the intake stroke may be injected as exhaust stroke injection.

FIG. 20 shows an example of the average piston velocity of the number 1 cylinder within the ranges of crank angle c1 to c2, c3 to c4 and c5 to c6 when the intake port pressure differential value dPM/dt is a positive value.

In the present embodiment, as the basic injection time (A), the period c3 to c4 where the intake flow velocity is the fastest (i.e., the piston velocity is the fastest) is selected. As the next injection added to the basic injection (A), the period c5 to c6 where the intake flow velocity is the second fastest (i.e., the piston velocity is the second fastest) is selected. As the injection further added to the injection (D), the period C1 to C2 where the intake flow velocity is the third fastest (i.e., the piston velocity is the third fastest) is selected.

As described above, as the allocation of the respective injection times is determined, even when the required torque changes, the injection at timing of fast intake velocity is allocated with high priority. Thus it is possible to improve the homogeneity of the air-fuel mixture.

In this manner, in the present embodiment, injection is allocated within the period where the intake port pressure differential value dPM/dt is a positive value during the intake stroke in correspondence with the required torque. With this arrangement, it is possible to set injection timing preferable to form homogeneous air-fuel mixture within a wider torque range.

As shown in the above-described embodiment, when the injection is performed such that all the injection periods during the intake stroke are included in the period where the intake port pressure differential value dPM/dt is a positive value, the most dispersed spray is attained in the intake port by the intake gas flow, and the air-fuel mixture is most homogeneous.

Figure 21:
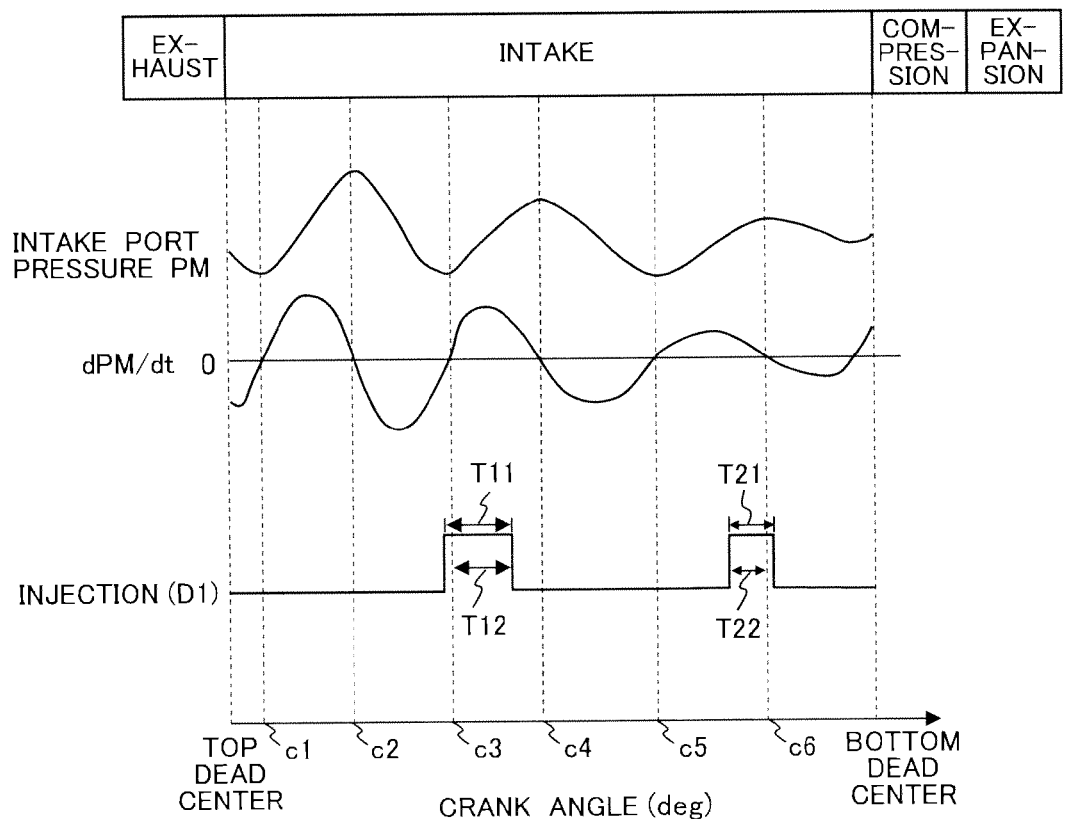
FIG. 21 is an explanatory diagram of an example of a preferred injection period candidate in the second embodiment, explaining that a part of the injection period is out of the period where the intake port pressure differential value >0 holds.

However, as shown in injection (Dl) in FIG. 21, even when a part of the injection period is out of the range where the intake port pressure differential value dPM/dt is a positive value, it is possible to disperse the spray in the intake port by the intake gas flow. With respect to all the injection periods T11+T21 during the intake stroke, as long as the injection period T12+T22 within the period where the intake port pressure differential value dPM/dt is a positive value is a large majority (more than half), i.e., (T12+T22)/(T11+T21)>0.5 holds, the amount of the fuel dispersed in the intake port by the intake gas flow is over the amount of the dispersion-suppressed fuel. Accordingly, it is possible to attain homogeneous air-fuel mixture.

Third Embodiment

In the present embodiment, another example of fuel injection at optimum timing in correspondence with gas flow velocity level in the intake port will be described.

The internal combustion engine according to the present embodiment is the same as that in the first embodiment, the explanation of the structure of the engine will be omitted.

Figure 22:
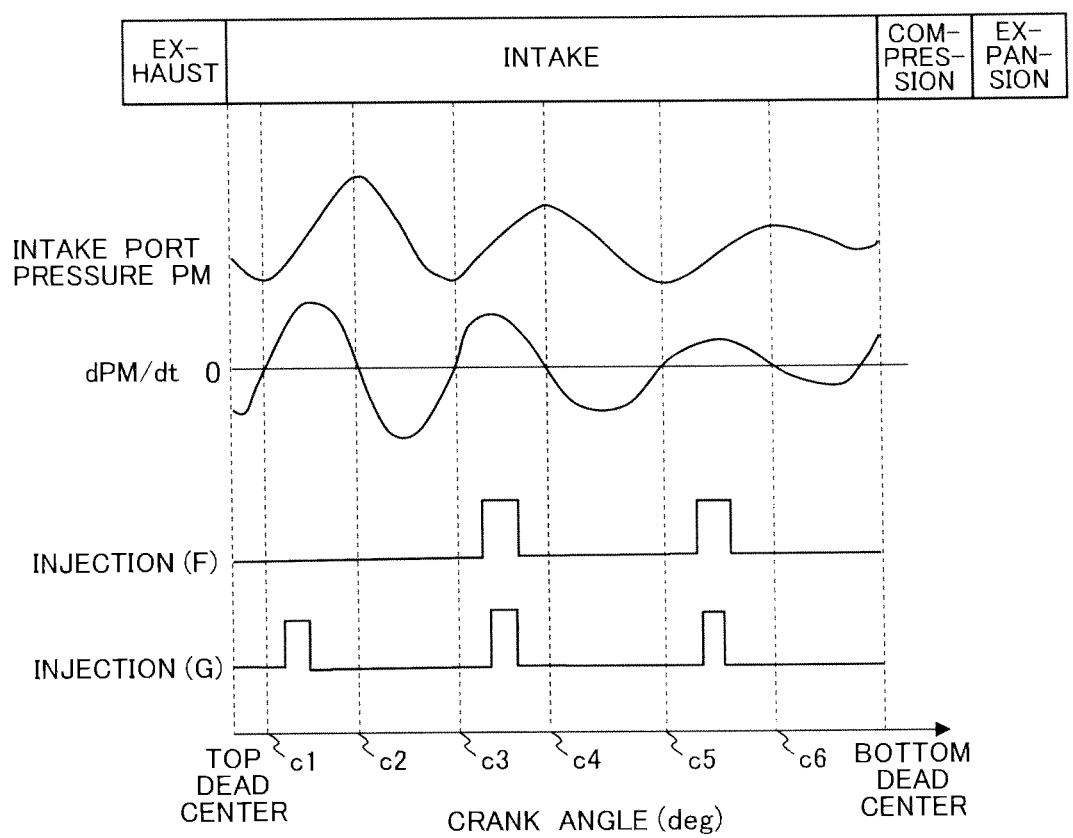
FIG. 22 is a timing chart explaining the injection time according to a third embodiment of the present invention.

FIG. 22 shows an example of a timing chart explaining the injection time according to the present embodiment. In the timing chart, in the engine cycle of intake, compression, expansion and exhaust, only the intake stroke of the number 1 cylinder is extracted.

The intake port pressure PM indicates cycle-averaged pressure of the intake port pressure in the number 1 cylinder detected with the intake port pressure sensor in the internal combustion engine according to the present embodiment. Further, the intake port pressure differential value dPM/dt indicates a time differential value of the intake port pressure PM. The methods for obtaining the intake port pressure PM and the intake port pressure differential value dPM/dt are the same as those in the first embodiment.

Injection time (F) and injection time (G) indicate preferable injection timing candidates in the present embodiment. These preferable injection timing candidates are selected such that they are included in a period where the intake port pressure differential value dPM/dt is a positive value. During the intake stroke in the present embodiment, the periods of crank angle c1 to c2, c3 to c4 and c5 to c6 are within the range where the intake port pressure differential value dPM/dt is a positive value.

Figure 23:
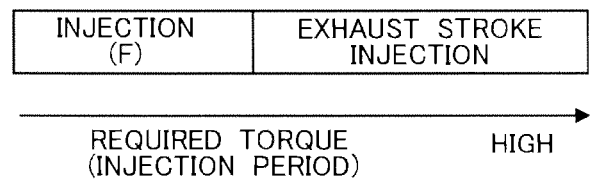
FIG. 23 is an explanatory diagram of the injection timing with respect to the required torque of the engine according to the third embodiment.
Figure 24:
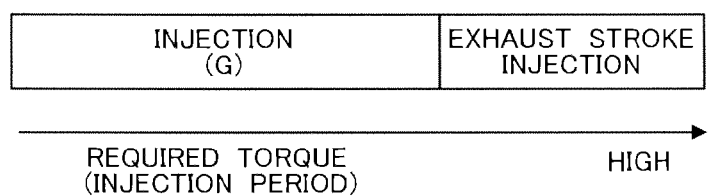
FIG. 24 is an explanatory diagram of another example of the injection timing with respect to the required torque of the engine according to the third embodiment.
Figure 25:
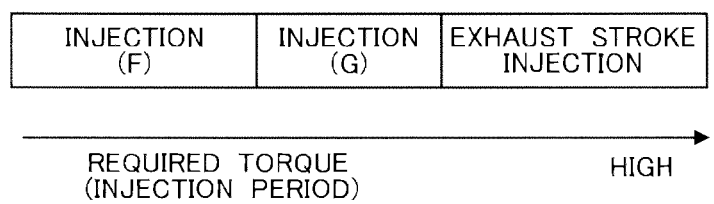
FIG. 25 is an explanatory diagram of another example of the injection timing with respect to the required torque in the engine according to the third embodiment.

FIG. 23 to FIG. 25 show an example of injection timing with respect to the required torque of the engine according to the present embodiment.

FIG. 23 shows an example of fuel injection at the injection time (F) when the required torque is lower than a predetermined threshold. That is, the injection is performed twice during the intake stroke. The respective injection operations are performed within the period where the intake port pressure differential value dPM/dt>0 holds. When the required torque is higher than the predetermined threshold, as the injection period is longer than the period of the intake port pressure differential value dPM/dt>0, the injection time is set during the exhaust stroke.

In this manner, when the injection during the intake stroke is divided, the injection period per one injection operation not divided, on the same torque condition. As the fuel injection is further concentrated in a period of fast intake velocity, it is possible to improve mixture of air and fuel in comparison with the case where the injection is not divided. Further, it is possible to weaken the penetration force of the spray by dividing the injection and to suppress attachment of the fuel spray to the wall surface.

FIG. 24 shows an example of fuel injection at the injection time (G) when the required torque is lower than the predetermined threshold. That is, the injection is performed thrice. The respective injection operations are performed within the period where the intake port pressure differential value dPM/dt>0 holds. When the required torque is higher than the predetermined threshold, as the injection period is longer than the period of intake port pressure differential value dPM/dt>0, the injection time is set during the exhaust stroke.

In this manner, as the number of times of injection during the intake stroke is increased within the range of the intake port pressure differential value dPM/dt>0, it is possible to perform injection during the intake stroke to the higher torque range. Upon injection during the intake stroke, as the fuel is dispersed by the intake flow, it is possible to obtain more homogeneous mixture of air and fuel in comparison with injection during the exhaust stroke.

FIG. 25 shows an example of selection of the injection time (F), the injection time (G) and the exhaust stroke injection, in accordance with rise of required torque.

During the intake stroke, when there are plural preferable injection timing candidates within the period where the intake port pressure differential value dPM/dt>0 holds, they may be variously combined. It may be arranged such that an optimum combination of these candidates is previously selected by operation condition by test or the like, and the injection timing combinations are stored as map data with respect to the number of revolutions, torque and the like, then the map data is read and the injection time is set.

As shown in the above embodiment, when injection is performed such that all the injection period of injection during the intake stroke are included in a period where the intake port pressure differential value dPM/dt is a positive value, the dispersion of the spray in the intake port by the intake gas flow is the maximum, and the maximum homogeneous air-fuel mixture is formed.

Figure 26:
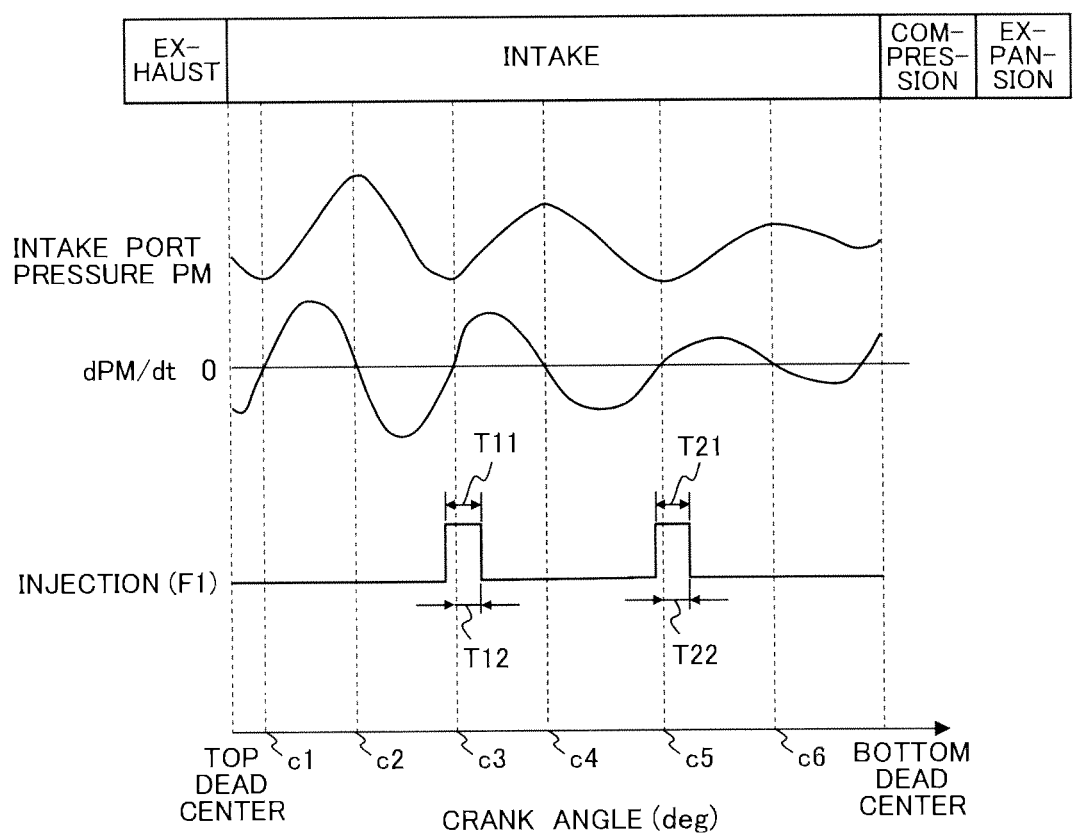
FIG. 26 is an explanatory diagram of an example of a preferred injection period candidate according to the third embodiment, explaining that a part of the injection period is out of the period where the intake port pressure differential value >0 holds.

However, as indicated with injection (F1), in FIG. 26, even when a part of the injection period is out of the period where the intake port pressure differential value dPM/dt is a positive value, it is possible to disperse the spray in the intake port by the intake gas flow. With respect to all the injection periods T11+T21 during the intake stroke, as long as the injection period T12+T22 within the period where the intake port pressure differential value dPM/dt is a positive value is a large majority (more than half), i.e., (T12+T22)/(T11+T21)>0.5 holds, the amount of the fuel dispersed in the intake port by the intake gas flow is over the amount of the fuel dispersion-suppressed by reverse flow or stagnation in the intake port. Accordingly, it is possible to attain homogeneous air-fuel mixture.

Fourth Embodiment

In the present embodiment, another example of fuel injection at optimum timing in correspondence with gas flow velocity level in the intake port will be described.

The internal combustion engine according to the present embodiment is the same as that in the first embodiment, the explanation of the structure of the engine will be omitted.

Figure 27:
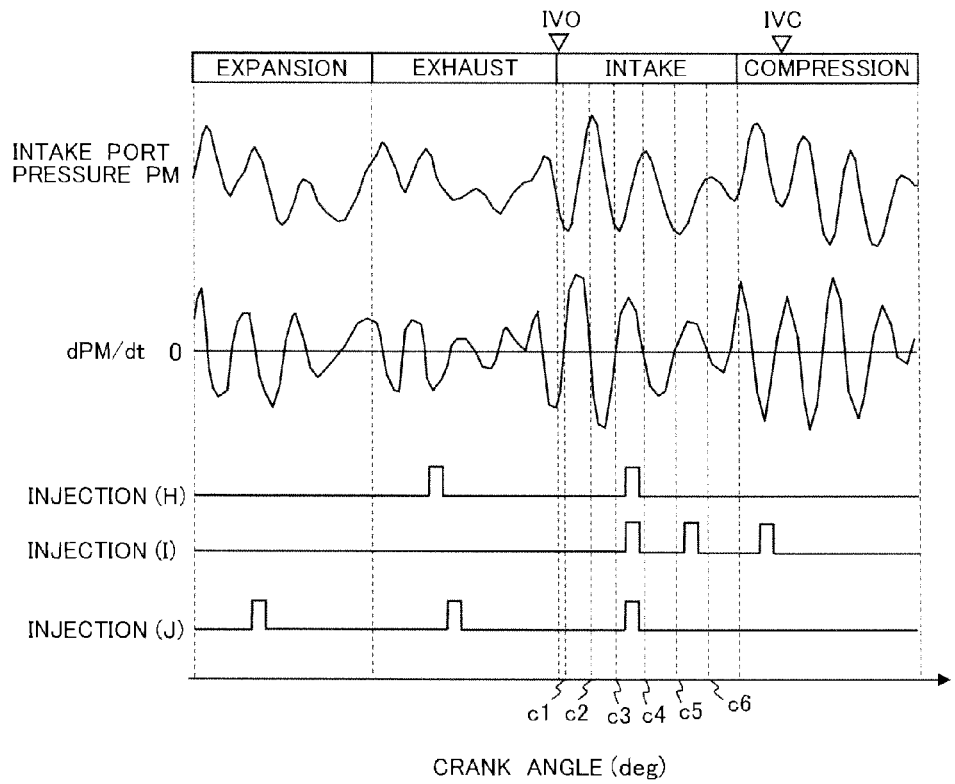
FIG. 27 is a timing chart explaining the injection time according to a fourth embodiment of the present invention.

FIG. 27 shows an example of a timing chart explaining the injection time according to the present embodiment. The timing chart shows all the engine cycle of the number 1 cylinder of intake, compression, expansion and exhaust.

The intake port pressure PM indicates cycle-averaged intake port pressure in the number 1 cylinder detected with the intake port pressure sensor in the internal combustion engine according to the present embodiment. Further, intake port pressure differential value dPM/dt indicates a time differential value of the intake port pressure PM. The methods for obtaining the intake port pressure PM and the intake port pressure differential value dPM/dt are the same as those in the first embodiment.

Injection time (H), injection time (I) and injection time (J) indicate preferable injection timing candidates in the present embodiment. These preferable injection timing candidates are combinations of at least one injection during the intake stroke and injection out of the intake stroke.

In these preferable injection timing candidates, injection timing during the intake stroke is selected so as to be included in the period where the intake port pressure differential value dPM/dt is a positive value. During the intake stroke in the present embodiment, the periods of crank angle c1 to c2, c3 to c4 and c5 to c6 are within the range where the intake port pressure differential value dPM/dt is a positive value.

When the required torque of the engine is increased or the number of revolutions is increased, it may be impossible to perform fuel injection by a necessary amount within the period of intake port pressure differential value dPM/dt>0 during the intake stroke.

In this case, the residual fuel during the intake stroke is injected during other stroke than the intake stroke.

Further, in accordance with form of intake pulse, even within the period of intake port pressure differential value dPM/dt>0, when, e.g., the piston velocity at the timing is low, it is impossible to obtain a sufficient intake velocity to disperse the fuel spray in the intake port.

In this case, during the intake stroke, injection is performed only at timing to obtain a sufficient intake velocity within the period of the intake port pressure differential value dPM/dt>0. The residual fuel is injected during other stroke than the intake stroke.

As described above, the fuel injected during the intake stroke is strongly influenced by the intake flow. Accordingly, when the injection timing is not set in a period of fast intake velocity, the mixture of air and fuel may be insufficient, or the attachment of the fuel to the wall surface may be increased.

On the other hand, the injection during other stroke than the intake stroke is performed in a status where there is almost no intake flow. Accordingly, the mixture and attachment to the wall surface are not influenced with respect to the injection timing.

Accordingly, the injection during the intake stroke is performed at timing where the homogeneity of the mixture and the attachment to the wall surface are infallibly improved. Regarding other cases, the injection is set in other stroke where the mixture and the attachment to the wall surface are more robust with respect to the injection timing than the intake stroke.

With this arrangement, it is possible to realize robust engine combustion even on changed operation condition while infallibly attaining the effect of improved mixture by the injection during the intake stroke.

Fifth Embodiment

In the present embodiment, another example of fuel injection at optimum timing in correspondence with gas flow velocity level in the intake port will be described.

In the above described first to fourth embodiments, the intake port pressure differential value dPM/dt is calculated from the detection value from the intake port pressure sensor, and an injection period where the intake port pressure differential value dPM/dt>0 holds is obtained from the intake port pressure differential value dPM/dt.

Figure 28:
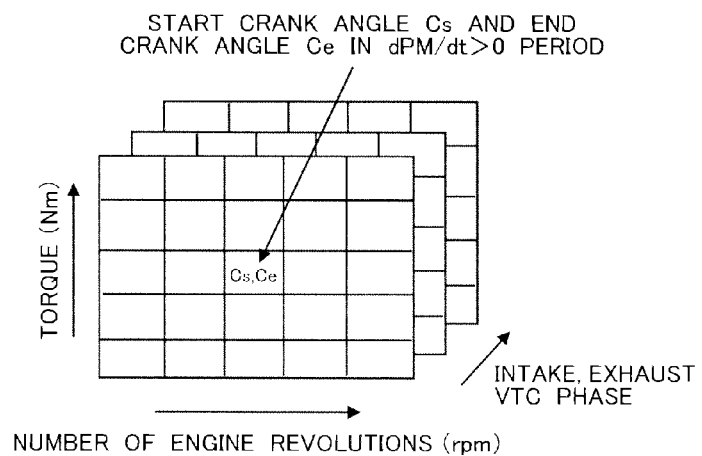
FIG. 28 is an explanatory diagram of the structure of map data to obtain the injection period when the intake port pressure differential value >0 holds according to a fifth embodiment of the present invention.

On the other hand, the difference from the first to fourth embodiments is that the injection period where the intake port pressure differential value dPM/dt>0 holds is read from map data. FIG. 28 shows an example of the map data to obtain the injection period where the intake port pressure differential value dPM/dt>0 holds. In the map data, as map data of the number of engine revolutions, the required torque, the phase angle (VTC phase angle) between the intake variable valve and the exhaust variable valve, a start crank angle when the intake port pressure differential value dPM/dt>0 holds (e.g., c1, c3 and c5 in FIG. 7) and an end crank angle when the intake port pressure differential value dPM/dt>0 holds (e.g., c2, c4 and c6 in FIG. 7) are stored.

Next, an example of the map data generation procedure will be described below.

An engine having an intake port pressure sensor is operated on various conditions of the number of revolutions, torque and VTC angle, and the intake port pressure values and crank angles are read into a computer as an engine external device. Then a cycle-averaged value of the intake port pressure and the intake port pressure differential value dPM/dt are obtained from the read pressure value by the method described above using FIG. 5. Further, a crank angle period where the intake port pressure differential value dPM/dt is a positive value is obtained, and the start crank angle and the end crank angle of the period are written as map data for the corresponding operation condition (the number of engine revolutions, torque and VTC angle) into the memory of the computer. The map data generated in this manner is transferred from the memory of the computer as an engine external device to the memory of the ECU.

Figure 29:
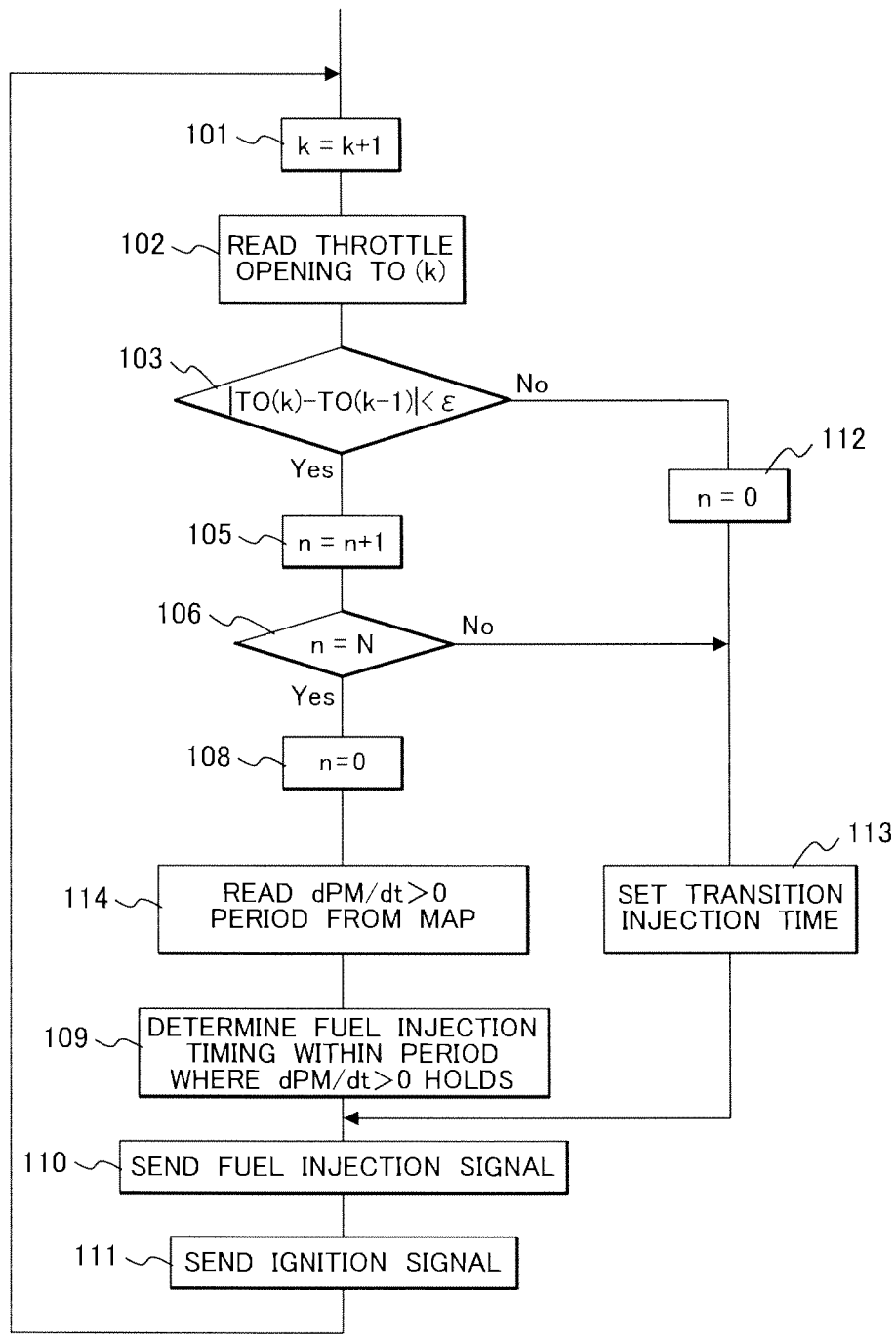
FIG. 29 is a flowchart showing the injection timing determination procedure according to the fifth embodiment.

FIG. 29 is a flowchart showing an example of the injection timing determination procedure in the ECU 13 according to the present embodiment. This flowchart is substantially the same as that shown in FIG. 12, and the difference is that step 107 in FIG. 12 is replaced with step 114.

That is, the difference from the first to fourth embodiments is that the above described map data is read at step 114 so as to obtain the period where the intake port pressure differential value dPM/dt>0 holds.

In the present embodiment, as long as the map data is previously generated, it is possible to perform optimum injection control even when the intake port pressure sensor is not incorporated in the engine. Accordingly, it is possible to reduce the engine cost. Further, since the reading of the intake port pressure from the sensor and calculation of the differential value are unnecessary, the processing in the ECU is simplified.

The present invention is not limited to the above described embodiments, but includes various modifications. For example, the above embodiments are described in detail for the sake of assistance in understanding of the present invention, and not limited to embodiment having all the described constituent elements. Further, it is possible to replace a part of the constituent elements of some embodiment with those of another embodiment. Further, it is possible to add the constituent elements of an embodiment to those of another embodiment. Further, it is possible to perform adding/deletion/replacement on a part of the constituent elements of the respective embodiments with those of another embodiment.

Further, a part or all the above described respective structures, functions, processors and the like may be realized as hardware by designing with e.g. an integrated circuit. Further, the above described respective structures, functions and the like may be realized as software by interpreting and performing a program to realize the respective functions with a processor.

Further, the shown control lines and information lines are those considered necessary for the sake of explanation, and not all the control lines and information lines are shown as a product.

What is claimed is:

1. A fuel injection control apparatus for an internal combustion engine, the internal combustion engine having an intake port which is connected to a plurality of cylinders and which is provided cylinder and a fuel injection valve which is provided at the intake port so as to inject fuel in the intake port, comprising:
   a fuel injection computation unit communicated with the intake port that calculates an amount of fuel injected from the fuel injection valve based on a torque amount of the internal combustion engine and transmits an injection signal to the fuel injection valve at a predetermined fuel injection time, and
   an intake port pressure sensor configured to sense a gas pressure in the intake port;
   wherein the fuel injection computation unit transmits the injection signal to the fuel injection valve so as to set more than half of a period to inject the fuel during an intake stroke of the cylinder within a period where the gas pressure in the intake port is increased, and
   wherein each of the cylinders has an intake valve which is open during the intake stroke, and the gas pressure is sensed at least during the intake stroke.

2. The fuel injection control apparatus for the internal combustion engine according to claim 1, further comprising:
   an encoder configured to detect a throttle valve opening of a throttle valve of an intake manifold of the internal combustion engine, and to supply a throttle valve opening signal indicating the throttle valve opening to the fuel injection computation unit,
   wherein the fuel injection computation unit controls an amount of gas flowing in an intake pipe in response to the throttle valve opening signal, and when the fuel injection computation unit determines from the throttle valve opening signal that an opening change of the throttle valve is smaller than a predetermined opening change, the fuel injection computation unit transmits the injection signal to the fuel injection valve so as to set more than half of the period to inject the fuel during the intake stroke in the cylinder within the period where the gas pressure is increased.

3. The fuel injection control apparatus for the internal combustion engine according to claim 1,
   wherein the fuel injection computation unit performs fuel injection a number of times during the intake stroke.

4. The fuel injection control apparatus for the internal combustion engine according to claim 1,
   wherein the fuel injection computation unit changes the number of times of fuel injection that fuel injection is performed during the intake stroke.

5. The fuel injection control apparatus for the internal combustion engine according to claim 1,
   wherein a plurality of periods where the intake port gas pressure is increased during the intake stroke are injection candidate periods, and
   wherein the fuel injection computation unit transmits the injection signal to the fuel injection valve so as to set more than half of the period to inject the fuel during the intake stroke as an injection candidate period where a piston velocity of a cylinder corresponding to the intake stroke is the fastest among the plurality of injection candidate periods.

6. The fuel injection control apparatus for the internal combustion engine according to claim 3,
   wherein a plurality of periods where the intake port gas pressure is increased during the intake stroke are injection candidate periods, and
   wherein fuel injection time for the fuel injection valve is allocated in accordance with a priority order of the plurality of injection candidate periods determined based on the piston velocity of the cylinder corresponding to the intake stroke.

7. The fuel injection control apparatus for the internal combustion engine according to claim 2,
   wherein the predetermined opening change is equal to or less than 1% of an opening upon full opening of the throttle valve.

8. A fuel injection control apparatus for an internal combustion engine used in the internal combustion engine having an intake port which is connected to a plurality of cylinders and which is provided independently per cylinder and a fuel injection valve provided at the intake port so as to inject fuel in the intake port, comprising:
   a fuel injection computation unit communicated with the intake port that calculates an amount of fuel injected from the fuel injection valve from a torque amount of the internal combustion engine and transmits an injection signal to the fuel injection valve at a predetermined fuel injection time, and
   wherein the fuel injection computation unit receives an intake port pressure signal from an intake port pressure sensor to detect at least a gas pressure in the intake port,
   wherein the fuel injection computation unit transmits the injection signal to the fuel injection valve so as to set more than half of a period to inject the fuel during an intake stroke of the cylinder provided with the intake port pressure sensor within a period where the gas pressure in the intake port detected with the intake port pressure sensor is increased, and wherein each of the cylinders has an intake valve which is open during the intake stroke and the gas pressure is sensed at least during the intake stroke.

9. The fuel injection control apparatus for the internal combustion engine according to claim 8, further comprising:

an encoder configured to detect a throttle valve opening of a throttle valve of an intake manifold of the internal combustion engine and to supply a throttle valve opening signal indicating the throttle valve opening to the fuel injection computation unit, wherein the fuel injection computation unit receives the throttle valve opening signal to control an amount of gas flowing in an intake pipe, and when the fuel injection computation unit determines from the throttle valve opening signal that an opening change of the throttle valve is smaller than a predetermined opening change, the fuel injection computation unit transmits the injection signal to the fuel injection valve so as to set more than half of the period to inject the fuel during the intake stroke in the cylinder provided with the intake port pressure sensor within the period where the gas pressure in the intake port detected with the intake port pressure sensor is increased.

10. A fuel injection control apparatus for an internal combustion engine, the internal combustion engine having an intake port which is connected to a plurality of cylinders and which is provided independently per cylinder and a fuel injection valve which is provided at the intake port so as to inject fuel in the intake port, comprising:

a fuel injection computation unit that calculates an amount of fuel injected from the fuel injection valve based on a torque amount of the internal combustion engine and transmits an injection signal to the fuel injection valve at predetermined fuel injection time, and wherein the fuel injection computation unit is communicated with the intake port and receives an intake port pressure signal from an intake port pressure sensor to detect at least one gas pressure in the intake port and a throttle valve opening signal received from an encoder of a throttle valve, so as to control an amount of gas flowing in an intake pipe, wherein the fuel injection computation unit transmits an injection signal to the fuel injection valve provided with the intake port having the intake port pressure sensor during an intake stroke of a cylinder connected to the intake port having at least the intake port pressure sensor, wherein each of the cylinders has an intake valve which is open during the intake stroke, and wherein the fuel injection computation unit transmits the injection signal to the fuel injection valve so as to set more than half of the period to inject the fuel during the intake stroke in the cylinder within the period where the gas pressure in the intake port is increased, and the gas pressure is sensed at least during the intake stroke.

11. The fuel injection control apparatus for the internal combustion engine according to claim 10, wherein the fuel injection computation unit obtains a time differential value of the intake port gas pressure or a sign of the time differential value of the gas pressure, and transmits the injection signal to the fuel injection valve based on the time differential value of the gas pressure or the sign of the time differential value of the gas pressure.

* * * * *